(12) United States Patent
Nakajima et al.

(10) Patent No.: US 10,338,864 B2
(45) Date of Patent: Jul. 2, 2019

(54) REMOTE COMMUNICATION SYSTEM THAT IMPROVES SECURITY OF REMOTE SESSION BETWEEN IMAGE FORMING APPARATUS AND CONNECTION TERMINAL, AND SESSION MANAGEMENT SYSTEM

(71) Applicant: KYOCERA Document Solutions Inc., Osaka (JP)

(72) Inventors: Koki Nakajima, Osaka (JP); Takeshi Nakamura, Osaka (JP); Keisuke Fukushima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/990,247

(22) Filed: May 25, 2018

(65) Prior Publication Data

US 2019/0004748 A1      Jan. 3, 2019

(30) Foreign Application Priority Data

Jun. 30, 2017   (JP) ................................ 2017-128643
Jun. 30, 2017   (JP) ................................ 2017-128666

(51) Int. Cl.
  *G06F 3/12*       (2006.01)
  *H04L 29/08*      (2006.01)
  *G06K 15/00*      (2006.01)

(52) U.S. Cl.
  CPC .......... *G06F 3/1222* (2013.01); *G06F 3/1236* (2013.01); *G06F 3/1284* (2013.01); *G06K 15/4095* (2013.01); *H04L 67/14* (2013.01)

(58) Field of Classification Search
  USPC ........................................................ 358/1.14
  See application file for complete search history.

(56) References Cited

U.S. PATENT DOCUMENTS

| 2003/0002077 A1* | 1/2003 | Shima ................... G06F 3/1222 358/1.15 |
| 2006/0195495 A1 | 8/2006 | Asano .......................... 708/111 |
| 2017/0366701 A1* | 12/2017 | Ooba ................. H04N 1/32747 |

FOREIGN PATENT DOCUMENTS

JP           2006-238199 A        9/2006

* cited by examiner

*Primary Examiner* — Ngon B Nguyen
(74) *Attorney, Agent, or Firm* — Stein IP, LLC

(57) ABSTRACT

A remote communication system includes an image forming apparatus, an electronic device, a session relay system, and a session management system. The session relay system notifies a first session ID and a second session ID to the session management system. The session management system executes a notification of the first session ID to the electronic device and a notification of the second session ID to the image forming apparatus. The electronic device establishes a connection with the session relay system. The connection uses the first session ID. The image forming apparatus establishes a connection with the session relay system. The connection uses the second session ID. The session relay system relays the session by associating the connection established with the electronic device with the connection established with the image forming apparatus using the first session ID and the second session ID.

9 Claims, 18 Drawing Sheets

REMOTE COMMUNICATION SYSTEM THAT IMPROVES SECURITY OF REMOTE SESSION BETWEEN IMAGE FORMING APPARATUS AND CONNECTION TERMINAL, AND SESSION MANAGEMENT SYSTEM

INCORPORATION BY REFERENCE

This application is based upon, and claims the benefit of priority from, corresponding Japanese Patent Application Nos. 2017-128643 and 2017-128666, each filed in the Japan Patent Office on Jun. 30, 2017, the entire contents of which are incorporated herein by reference.

BACKGROUND

Unless otherwise indicated herein, the description in this section is not prior art to the claims in this application and is not admitted to be prior art by inclusion in this section.

There is known a system that executes a communication between an image forming apparatus and an electronic device located inside a Local Area Network (LAN) to which the image forming apparatus belongs. This system causes the image forming apparatus to display a User Interface (UI) screen generated by the electronic device and causes the image forming apparatus to execute a print job based on print data accumulated in the electronic device.

SUMMARY

A remote communication system according to a first aspect of the disclosure includes an image forming apparatus, an electronic device, a session relay system, and a session management system. The electronic device is located outside a network to which the image forming apparatus belongs. The session relay system relays a session between the image forming apparatus and the electronic device. The session management system manages the session. The session relay system notifies a first session ID and a second session ID to the session management system. The first session ID and the second session ID are session IDs to identify communication by the session in the session relay system. The session management system executes a notification of the first session ID to the electronic device and a notification of the second session ID to the image forming apparatus. The electronic device establishes a connection with the session relay system. The connection uses the first session ID. The image forming apparatus establishes a connection with the session relay system. The connection uses the second session ID. The session relay system relays the session by associating the connection established with the electronic device with the connection established with the image forming apparatus using the first session ID and the second session ID.

A remote communication control system according to a second aspect of the disclosure includes a session relay system, a session management unit, and a deployment execution unit. The session relay system relays a session between an image forming apparatus and an electronic device by associating a connection established with the image forming apparatus with a connection established with the electronic device. The electronic device is located outside a network to which the image forming apparatus belongs. The session management unit manages the session. The deployment execution unit executes a deployment of the session relay system. When the deployment is instructed and when the session relayed by the session relay system exists, the session management unit terminates the existing session. When the deployment is instructed, the deployment execution unit executes the deployment when the session relayed by the session relay system does not exist.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
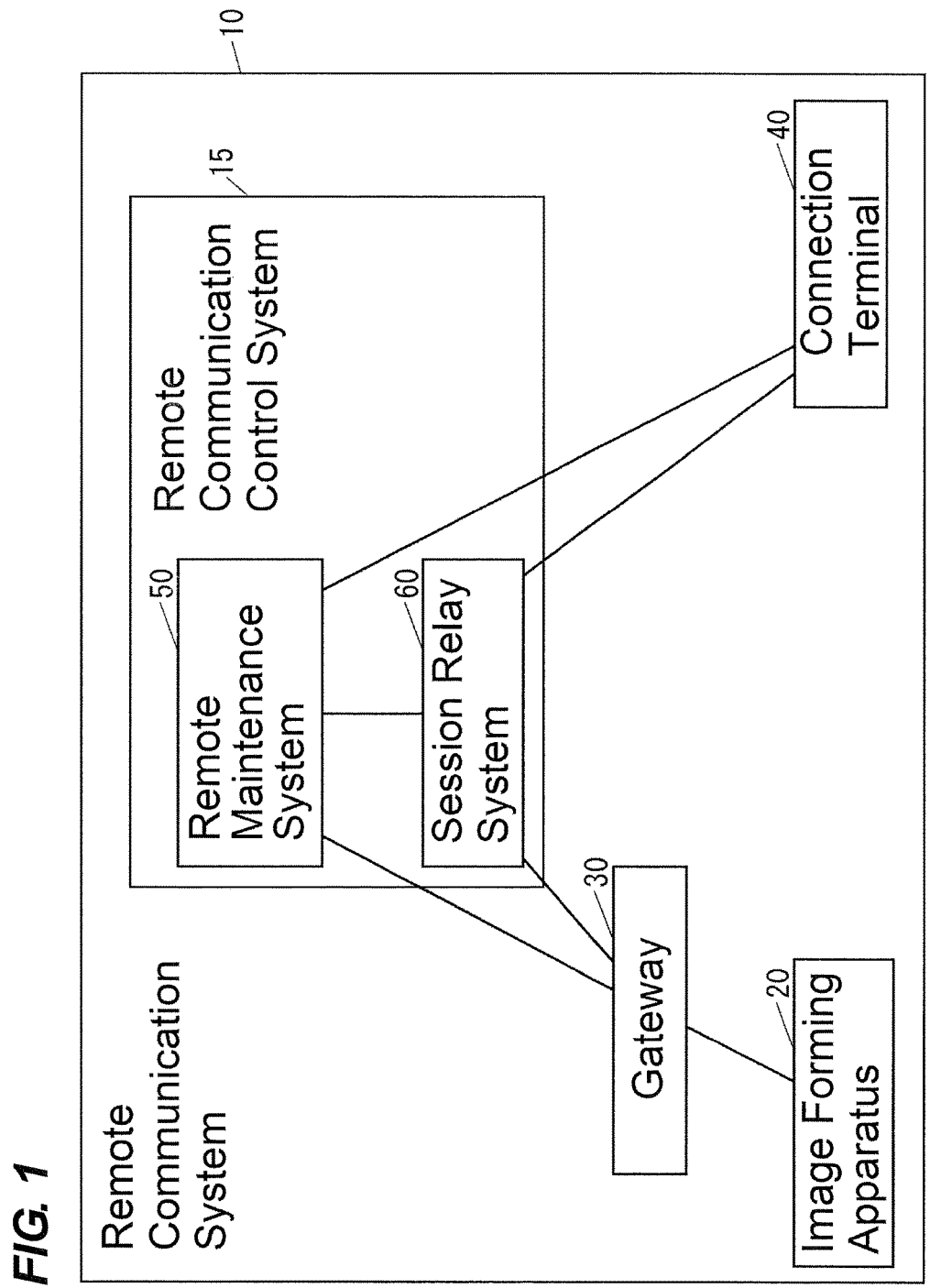
FIG. 1 illustrates a block diagram of a remote communication system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, a configuration of a remote communication system according to the embodiment will be described.

FIG. 1 illustrates a block diagram of a remote communication system 10 according to the embodiment.

As illustrated in FIG. 1, the remote communication system 10 includes an image forming apparatus 20, a gateway 30, a connection terminal 40, and a remote communication control system 15. The gateway 30 connects a network, such as a Local Area Network (LAN), to which the image forming apparatus 20 belongs, to a network, such as Internet. The connection terminal 40 is an electronic device located outside the network to which the image forming apparatus 20 belongs. The remote communication control system 15 controls a communication between the image forming apparatus included in the remote communication system 10 and the connection terminal included in the remote communication system 10.

The remote communication control system 15 includes a remote maintenance system 50 and a session relay system 60. The remote maintenance system 50 is a cloud service that executes a remote maintenance to the image forming apparatus included in the remote communication system 10 corresponding to an instruction from the connection terminal included in the remote communication system 10. The session relay system 60 is a cloud service that relays a direct interconnection between the image forming apparatus included in the remote communication system 10 and the connection terminal included in the remote communication system 10, that is, a Peer to Peer session (hereinafter referred to as a "remote session").

The remote communication system 10 can include an image forming apparatus in addition to the image forming apparatus 20 in the network to which the image forming apparatus 20 belongs. The remote communication system 10 can include a network to which an image forming apparatus belongs in addition to the network to which the image forming apparatus 20 belongs. The image forming apparatus included in the remote communication system 10 is, for example, an image forming apparatus, such as a Multifunction Peripheral (MFP), a printer-only machine, a copy-only machine, a FAX-only machine, and a scanner-only machine.

The gateway 30 configures a firewall that prevents an attack to an inside of the network to which the image forming apparatus 20 belongs from an outside of this network. Therefore, a communication between the image forming apparatus included in the remote communication system 10 and the remote maintenance system 50 is maintained by keeping the image forming apparatus included in the remote communication system 10 connecting to the remote maintenance system 50 by an Extensible Messaging and Presence Protocol (XMPP).

The remote communication system 10 can include a connection terminal in addition to the connection terminal 40. The connection terminal included in the remote communication system 10 is, for example, a computer, such as a Personal Computer (PC).

The remote maintenance system 50 is constituted of, for example, a server computer. The remote maintenance executed by the remote maintenance system 50 is, for example, maintenance, such as a confirmation of a counter of the image forming apparatus and an installation of firmware to the image forming apparatus. The remote maintenance system 50 not only executes the remote maintenance but also manages a remote session. That is, the remote maintenance system 50 configures the session management system of the disclosure.

The session relay system 60 is constituted of, for example, a server computer.

The image forming apparatus included in the remote communication system 10 and the remote maintenance system 50 can communicate via a network, such as Internet. The image forming apparatus included in the remote communication system 10 and the session relay system 60 can communicate via a network, such as Internet. The connection terminal included in the remote communication system 10 and the remote maintenance system 50 can communicate via a network, such as Internet. The connection terminal included in the remote communication system 10 and the session relay system 60 can communicate via a network, such as Internet. The remote maintenance system 50 and the session relay system 60 can communicate via a network, such as Internet.

Figure 2:
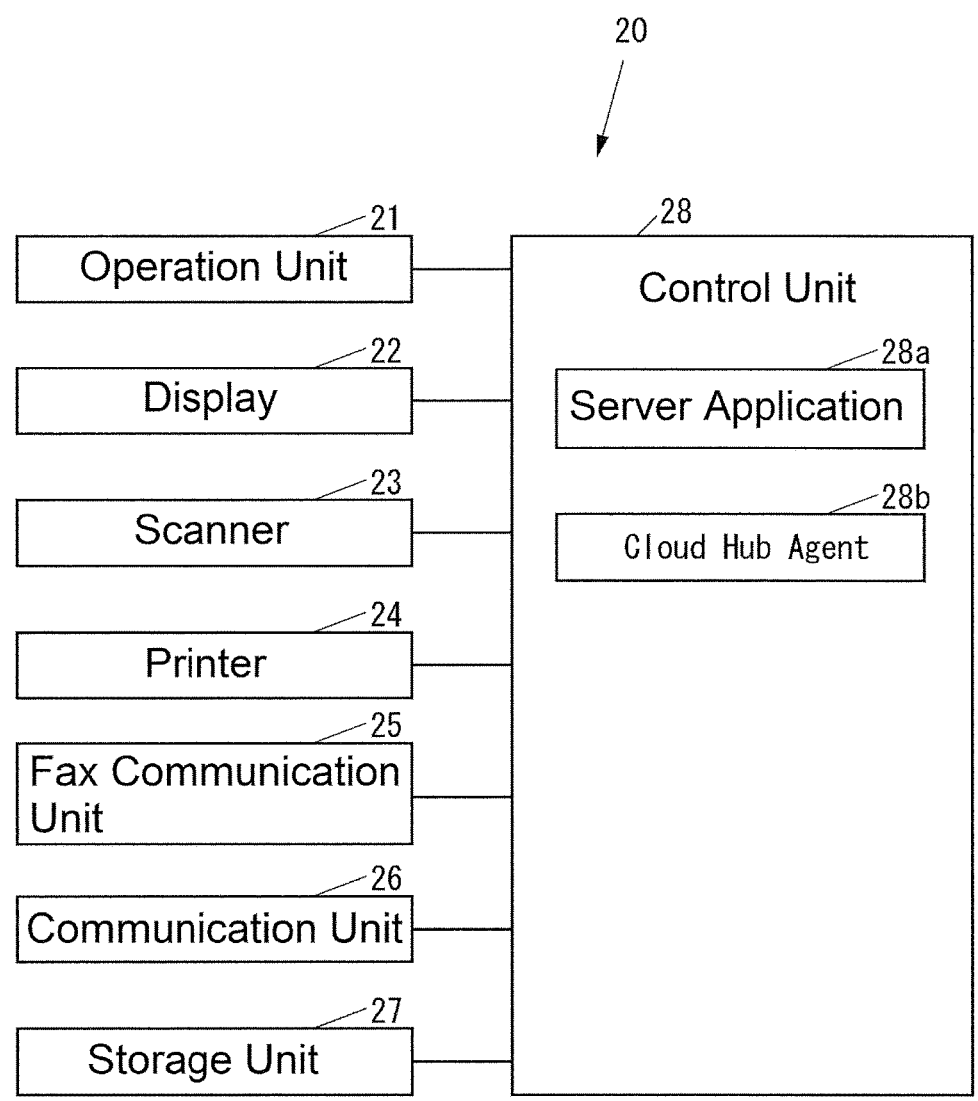
FIG. 2 illustrates a block diagram when an image forming apparatus according to the one embodiment is an MFP.

FIG. 2 illustrates a block diagram when the image forming apparatus 20 is an MFP.

The image forming apparatus 20 illustrated in FIG. 2 includes an operation unit 21, a display 22, a scanner 23, a printer 24, a fax communication unit 25, a communication unit 26, a storage unit 27, and a control unit 28. The operation unit 21 is an input device, such as buttons, with which various kinds of operations are input. The display 22 is a display device, such as a Liquid Crystal Display (LCD), that displays various pieces of information. The scanner 23 is a reading device that reads an image from an original document. The printer 24 is a print device that prints the image on a recording medium, such as a paper sheet. The fax communication unit 25 is a facsimile device that carries out fax communication with an external fax device (not illustrated) via a communication line, such as a dial-up line. The communication unit 26 is a communication device that communicates with an external device via a network or directly with wire or wireless without a network. The storage unit 27 is a non-volatile storage device, such as a semiconductor memory and a Hard Disk Drive (HDD), that stores various pieces of information. The control unit 28 controls the whole image forming apparatus 20.

The control unit 28 includes, for example, a Central Processing Unit (CPU), a Read Only Memory (ROM) that stores programs and various data, and a Random Access Memory (RAM) used as a work area for the CPU. The CPU executes the programs stored in the ROM or the storage unit 27.

The control unit 28 executes the programs stored in the ROM or the storage unit 27 to implement a server application 28a used from the connection terminal included in the remote communication system 10 via the remote session and a Cloud Hub Agent 28*b* that controls a communication with the session relay system 60 (see FIG. 1).

The control unit 28 can implement a server application in addition to the server application 28*a* by executing the programs stored in the ROM or the storage unit 27.

The server application implemented by the control unit 28 includes, for example, a Web Server that notifies the outside of the network to which the image forming apparatus 20 belongs of various setting conditions of the image forming apparatus 20 and accepts various settings of the image forming apparatus 20 from the outside of the network to which the image forming apparatus 20 belongs. Additionally, the server application implemented by the control unit 28 includes, for example, a Remote APP Server that transmits data of a screen (for example, a Webpage) displayed on the display 22 of the image forming apparatus 20 to the outside of the network to which the image forming apparatus 20 belongs and receives an operation to the screen displayed based on this data from the outside of the network to which the image forming apparatus 20 belongs to cause the image forming apparatus 20 to operate corresponding to the received operation.

The server application implemented by the control unit 28 can be identified by an application ID.

Figure 3:
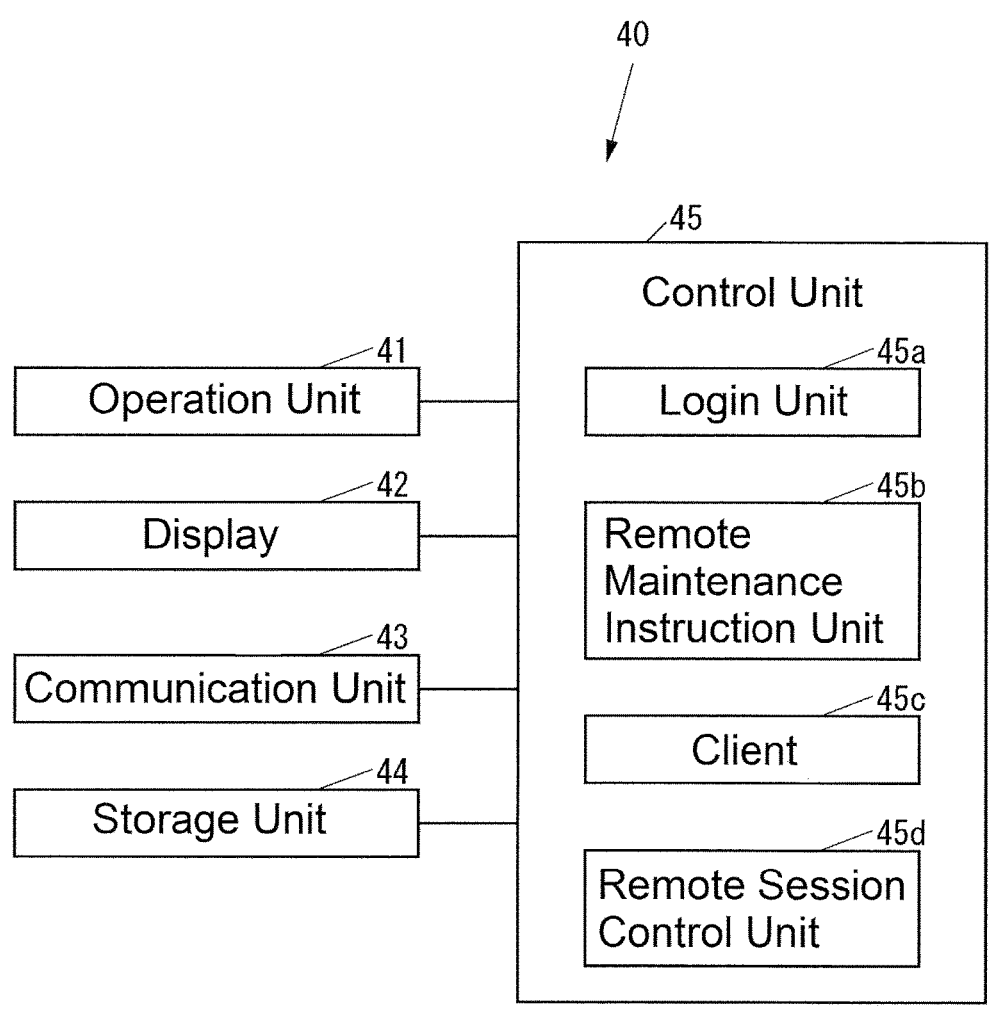
FIG. 3 illustrates a block diagram of a connection terminal according to the one embodiment.

FIG. 3 illustrates a block diagram of the connection terminal 40.

As illustrated in FIG. 3, the connection terminal 40 includes an operation unit 41, a display 42, a communication unit 43, a storage unit 44, and a control unit 45. The operation unit 41 is an input device, such as a keyboard and a mouse, with which various kinds of operations are input. The display 42 is a display device, such as an LCD, that displays various pieces of information. The communication unit 43 is a communication device that communicates with an external device via the network or directly with wire or wireless without the network. The storage unit 44 is a non-volatile storage device, such as a semiconductor memory and an HDD that stores various pieces of information. The control unit 45 controls the whole connection terminal 40.

The control unit 45 includes, for example, a Central Processing Unit (CPU), a Read Only Memory (ROM) that stores programs and various data, and a Random Access Memory (RAM) used as a work area for the CPU. The CPU executes the programs stored in the ROM or the storage unit 44.

The control unit 45 executes the programs stored in the ROM or the storage unit 44 to implement a login unit 45*a*, a remote maintenance instruction unit 45*b*, a client 45*c*, and a remote session control unit 45*d*. The login unit 45*a* executes a login process to the remote maintenance system 50. The remote maintenance instruction unit 45*b* instructs the remote maintenance to the remote maintenance system 50. The client 45*c* uses the server application of the image forming apparatus included in the remote communication system 10 via the remote session. The remote session control unit 45*d* controls the remote session.

The control unit 45 can implement a client in addition to the client 45*c* by executing the programs stored in the ROM or the storage unit 44.

The client implemented by the control unit 45 includes, for example, a Web Browser that displays a setting condition notified from the Web Server as the server application on the display 42 and instructs various kinds of settings input from the operation unit 41 to this Web Server. Additionally, the client implemented by the control unit 45 includes, for example, an application, such as a Remote APP Client, that displays a screen based on data of a screen received from a Remote APP Server as a server application on the display 42 and transmits the operation input to this screen from the operation unit 41 to this Remote APP Server.

The client implemented by the control unit 45 can be identified by an application ID. The application ID for identifying the client implemented by the control unit 45 is identical to the application ID for identifying the server application of the image forming apparatus corresponding to this client.

Figure 4:
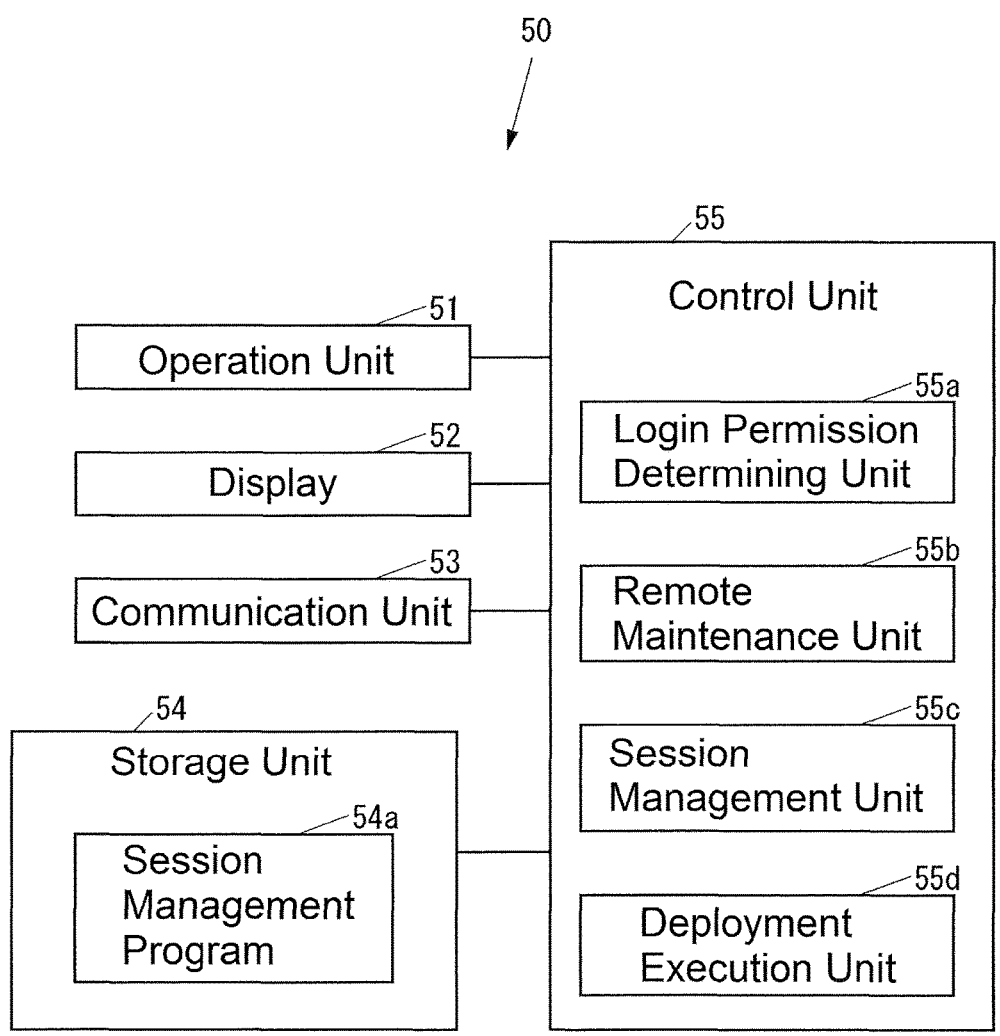
FIG. 4 illustrates a block diagram of functions of a remote maintenance system according to the one embodiment when the remote maintenance system is configured using one server computer.

FIG. 4 illustrates a block diagram of functions of the remote maintenance system 50 when the remote maintenance system 50 is configured by one server computer.

As illustrated in FIG. 4, the remote maintenance system 50 includes an operation unit 51, a display 52, a communication unit 53, a storage unit 54, and a control unit 55. The operation unit 51 is an input device such as a keyboard and a mouse to which various kinds of operations are input. The display 52 is a display device such as an LCD that displays various kinds of information. The communication unit 53 is a communication device that communicates with an external device via the network or directly with wire or wireless without the network. The storage unit 54 is a non-volatile storage device such as a semiconductor memory and an HDD that store various kinds of information. The control unit 55 controls the entire remote maintenance system 50.

The storage unit 54 stores a session management program 54*a* for controlling the remote session.

The control unit 55 includes, for example, a CPU, a ROM that stores programs and various kinds of data, and a RAM used as a work area of the CPU. The CPU executes the programs stored in the ROM or the storage unit 54.

The control unit 55 executes the session management program 54*a* to implement a login permission determining unit 55*a*, a remote maintenance unit 55*b*, a session management unit 55*c*, and a deployment execution unit 55*d*. The login permission determining unit 55*a* determines whether to permit a user login. The remote maintenance unit 55*b* executes the remote maintenance. The session management unit 55*c* manages the remote session. The deployment execution unit 55*d* executes a deployment of the session relay system 60 (see FIG. 1).

Figure 5:
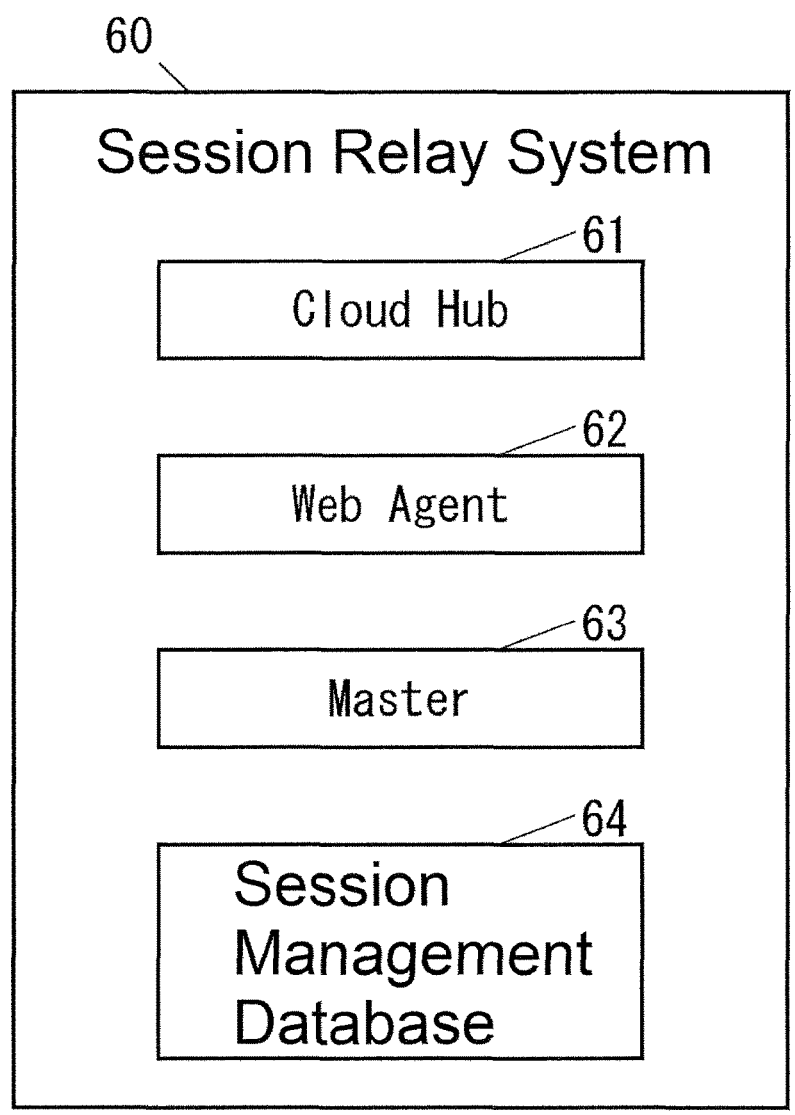
FIG. 5 illustrates a function implemented by a session relay system according to the one embodiment.

FIG. 5 illustrates a function implemented by the session relay system 60.

As illustrated in FIG. 5, the session relay system 60 executes a specific program to implement a Cloud Hub 61 that controls a communication with the image forming apparatus included in the remote communication system 10. The session relay system 60 executes a specific program so as to ensure implementing a Cloud Hub in addition to the Cloud Hub 61.

The session relay system 60 executes a specific program to implement a Web Agent 62 that controls a communication with the connection terminal included in the remote communication system 10. The session relay system 60 executes a specific program so as to ensure implementing a Web Agent in addition to the Web Agent 62.

The session relay system 60 executes a specific program to implement a Master 63 and a session management database 64. The Master 63 determines which Cloud Hub is connected to the image forming apparatus and which Web Agent is connected to the connection terminal. The session management database 64 stores a log relating to the remote session.

The Cloud Hub included in the session relay system 60 and the Web Agent included in the session relay system 60 are in a relationship on a one-to-one basis. That is, a count of the Cloud Hub included in the session relay system 60 and a count of the Web Agent included in the session relay system 60 are identical.

When the image forming apparatus included in the remote communication system 10 is connected to the session relay system 60, the Master 63 determines which Cloud Hub is connected to this image forming apparatus. However, an operation of the Master 63 will not be further elaborated below.

Similarly, when the connection terminal included in the remote communication system 10 is connected to the session relay system 60, the Master 63 determines which Web Agent is connected to this connection terminal. However, an operation of the Master 63 will not be further elaborated below.

Next, an operation of the remote communication system 10 will be described.

First, an operation of the remote communication system 10 when a user of the connection terminal 40 logs in to the remote maintenance system 50 will be described.

Figure 6:
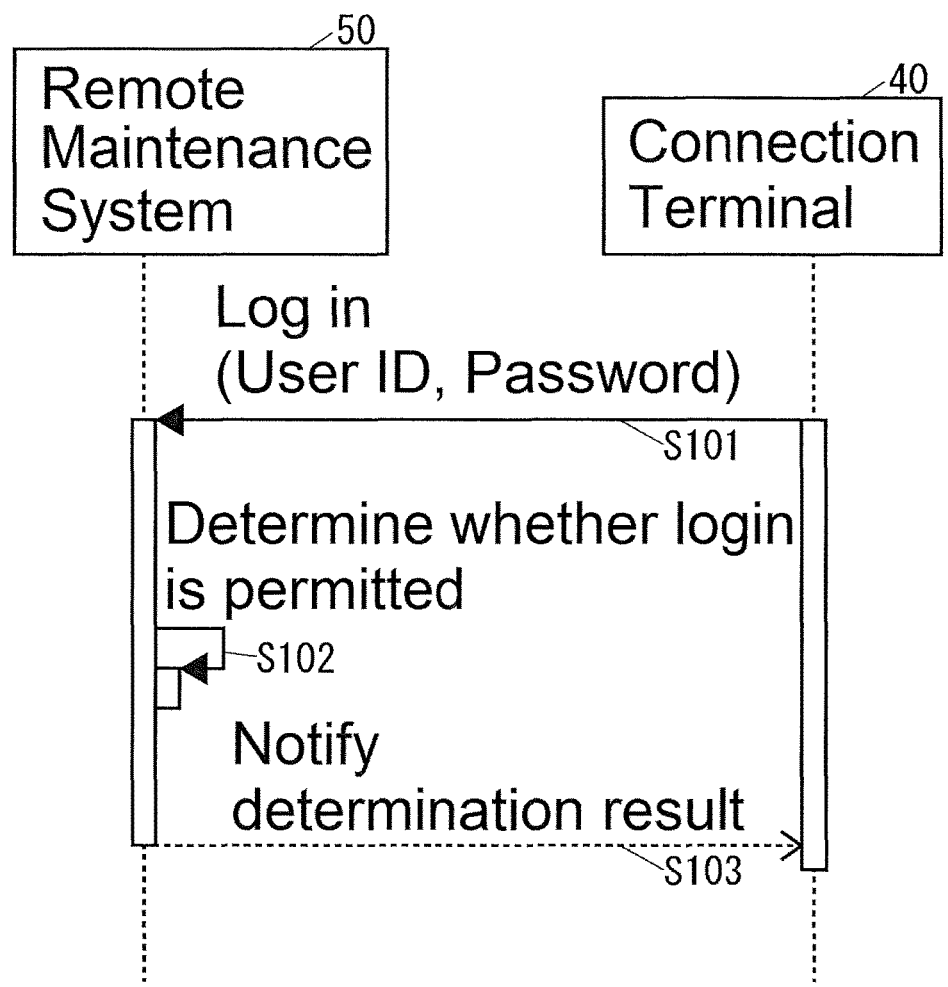
FIG. 6 illustrates an operation of the remote communication system according to the one embodiment when a user of the connection terminal logs in to the remote maintenance system.

FIG. 6 illustrates the operation of the remote communication system 10 when the user of the connection terminal 40 logs in to the remote maintenance system 50.

The user of the connection terminal 40 can instruct a login to the remote maintenance system 50 by inputting a user ID and a password via the operation unit 41. When accepting the instruction to log in to the remote maintenance system 50, the login unit 45*a* of the connection terminal 40 notifies the remote maintenance system 50 of the user ID and the password input via the operation unit 41 as illustrated in FIG. 6 to execute a login process to the remote maintenance system 50 (Step S101).

The login permission determining unit 55*a* of the remote maintenance system 50 determines whether the login of the user is permitted or not based on a combination of the user ID and the password notified from the connection terminal 40 when the connection terminal 40 requests the login (Step S102), and replies a determination result to the connection terminal 40 (Step S103).

Next, an operation of the remote communication system 10 when the remote maintenance is executed via the remote maintenance system 50 will be described.

Figure 7:
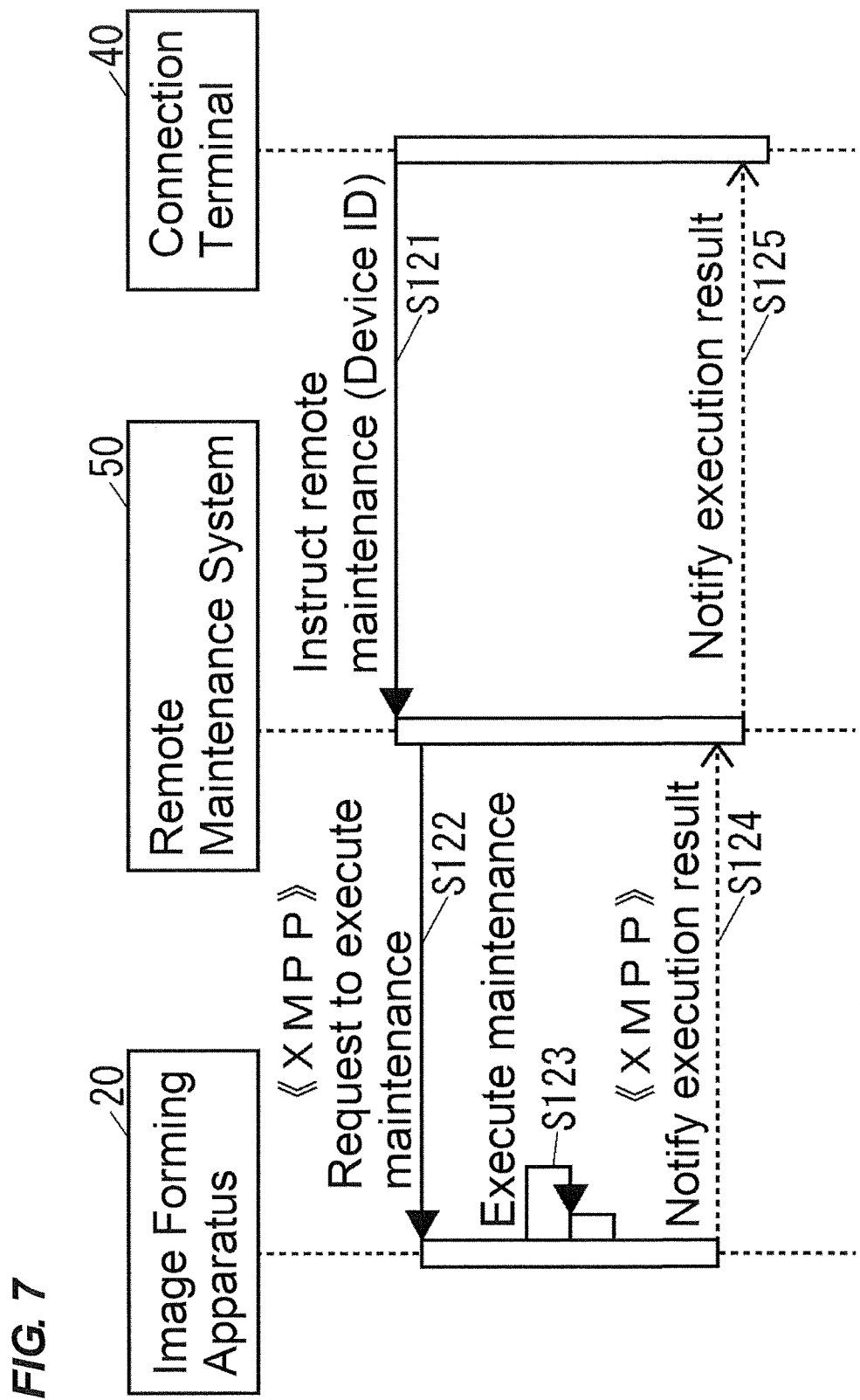
FIG. 7 illustrates an operation of the remote communication system according to the one embodiment when a remote maintenance is executed via the remote maintenance system.

FIG. 7 illustrates the operation of the remote communication system 10 when the remote maintenance is executed via the remote maintenance system 50.

When being logged in to the remote maintenance system 50, the user of the connection terminal 40 can instruct the remote maintenance of a specific image forming apparatus (hereinafter described as the image forming apparatus 20 in the description of the operation illustrated in FIG. 7) via the remote maintenance system 50. This remote maintenance is instructed via the operation unit 41. When accepting the instruction of the remote maintenance via the remote maintenance system 50, the remote maintenance instruction unit 45*b* of the connection terminal 40 notifies the remote maintenance system 50 of a device ID of the image forming apparatus 20 instructed via the operation unit 41 as illustrated in FIG. 7 to instruct the remote maintenance instructed via the operation unit 41 to the remote maintenance system 50 (Step S121).

When being instructed the remote maintenance from the connection terminal 40, the remote maintenance unit 55*b* of the remote maintenance system 50 requests the image forming apparatus 20 designated as a target of the remote maintenance from the connection terminal 40 to execute the maintenance instructed from the connection terminal 40 by the XMPP (Step S122).

When the remote maintenance system 50 requests the maintenance, the control unit 28 of the image forming apparatus 20 executes the maintenance requested by the remote maintenance system 50 (Step S123), and notifies the remote maintenance system 50 of an execution result of the maintenance by the XMPP (Step S124).

When the execution result of the maintenance is notified from the image forming apparatus 20, the remote maintenance unit 55*b* of the remote maintenance system 50 notifies the connection terminal 40 of the execution result notified from the image forming apparatus 20 (Step S125).

Next, an operation of the remote communication system 10 when the remote session is started will be described.

Figure 8:
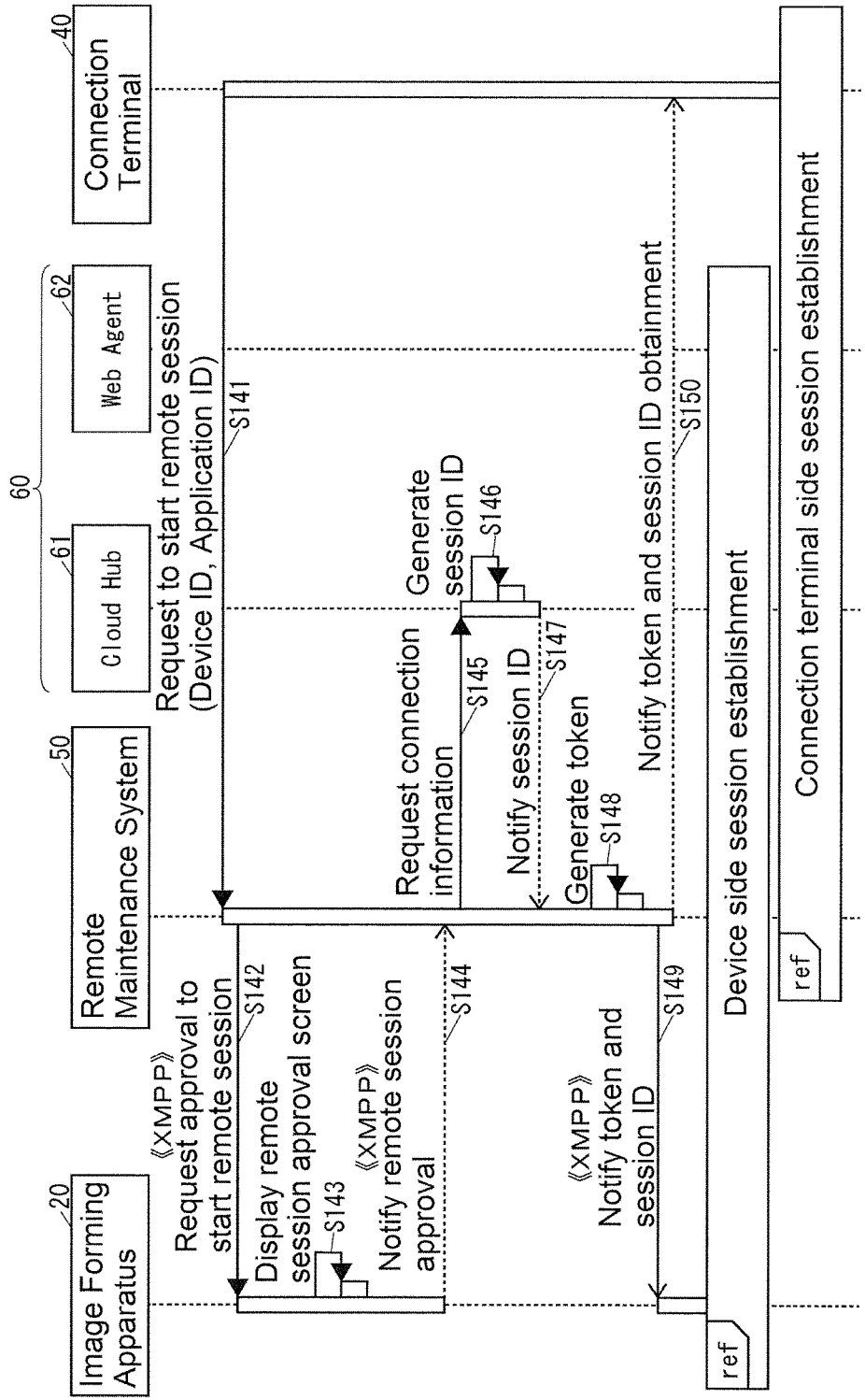
FIG. 8 illustrates an operation of the remote communication system according to the one embodiment when a remote session is started.
Figure 9:
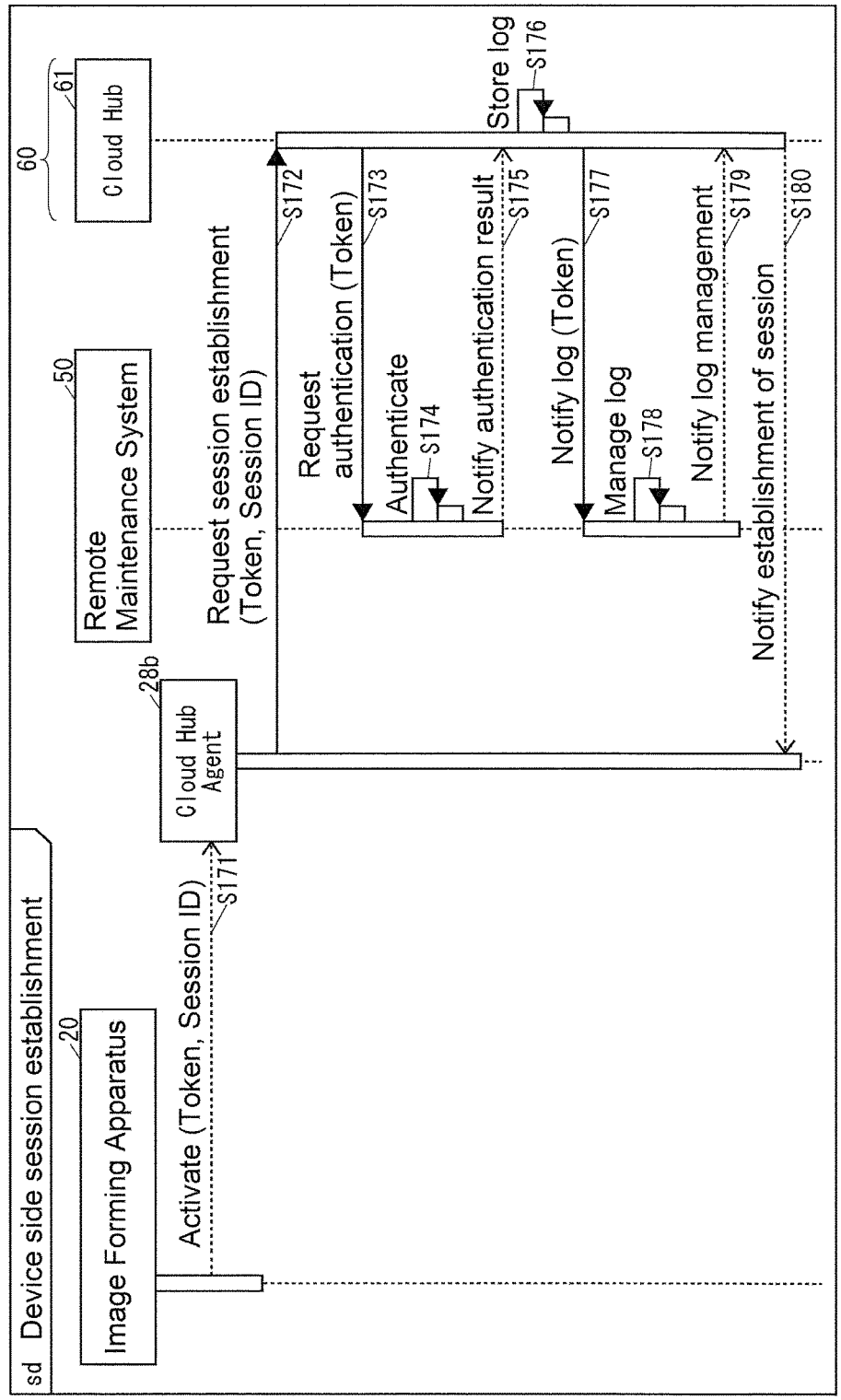
FIG. 9 illustrates a sequence diagram of a device side session establishment illustrated in FIG. 8.
Figure 10:
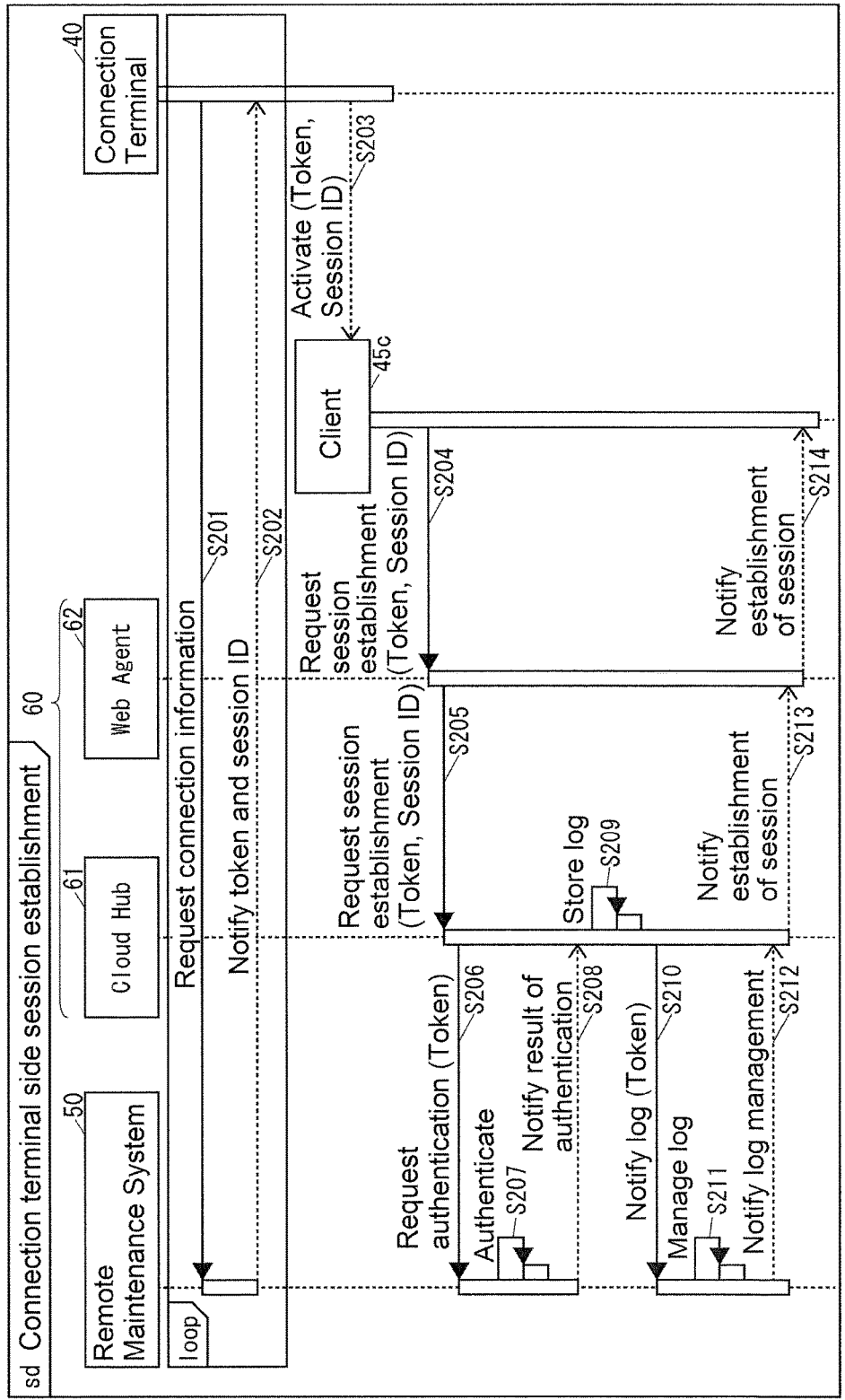
FIG. 10 illustrates a sequence diagram of a connection terminal side session establishment illustrated in FIG. 8.

FIG. 8 illustrates the operation of the remote communication system 10 when the remote session is started. FIG. 9 illustrates a sequence diagram of a device side session establishment illustrated in FIG. 8. FIG. 10 illustrates a sequence diagram of a connection terminal side session establishment illustrated in FIG. 8.

When being logged in to the remote maintenance system 50, the user of the connection terminal 40 can designate a specific client (hereinafter described as the client 45*c* in the description of the operation illustrated in FIGS. 8 to 10) and instruct to start the remote session with a specific image forming apparatus (hereinafter described as the image forming apparatus 20 in the description of the operation illustrated in FIGS. 8 to 10) via the operation unit 41. As illustrated in FIGS. 8 to 10, when accepting the instruction to start the remote session, the remote session control unit 45*d* of the connection terminal 40 notifies the remote maintenance system 50 of the device ID of the image forming apparatus 20 instructed via the operation unit 41 and an application ID of the client 45*c* instructed via the operation unit 41 to request the remote maintenance system 50 to start the remote session (Step S141).

It is preferred that the user of the connection terminal 40 separately inform a user of the image forming apparatus 20 of the fact that starting the remote session with the image forming apparatus 20 is desired by means of, for example, a telephone call before instructing to start the remote session with the image forming apparatus 20 via the operation unit 41 when the user of the connection terminal 40 instructs to start the remote session with the image forming apparatus 20 via the operation unit 41.

When accepting the request of Step S141, the session management unit 55*c* of the remote maintenance system 50 notifies the image forming apparatus 20 specified by the device ID notified at Step S141 of the application ID notified at Step S141 to request an approval to start the remote session by the XMPP (Step S142).

When receiving the request of Step S142, the server application 28*a* specified by the application ID notified at Step S142 among the server applications of the image forming apparatus 20 displays a remote session approval screen 70 (see FIG. 11) that accepts the instruction whether to approve the start of the remote session on the display 22 (Step S143).

Figure 11:
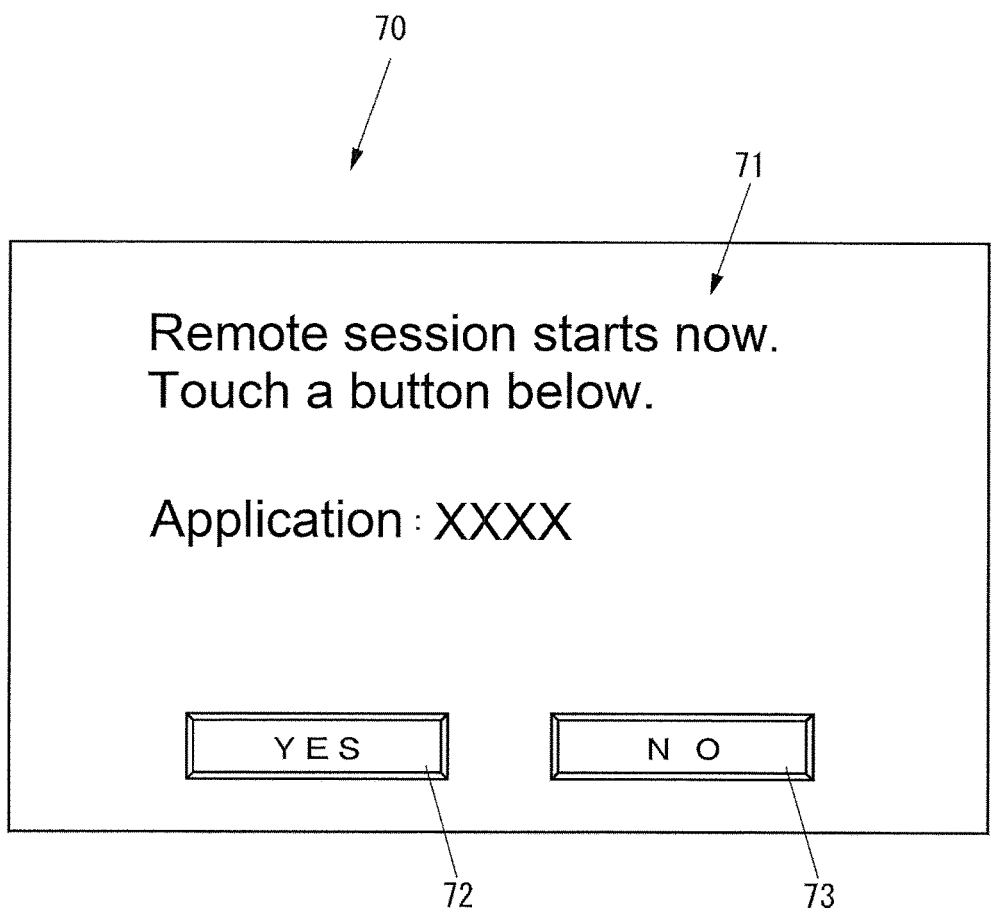
FIG. 11 illustrates an exemplary remote session approval screen displayed in the operation illustrated in FIG. 8.

FIG. 11 illustrates an example of the remote session approval screen 70.

The remote session approval screen 70 illustrated in FIG. 11 includes a message 71, a YES button 72, and a NO button 73. The message 71 queries whether the remote session is approved or not. The YES button 72 is for accepting an instruction to approve starting the remote session. The NO button 73 is for accepting an instruction not to approve starting the remote session. The user of the image forming apparatus 20 can press any one of the YES button 72 and the NO button 73 via the operation unit 21.

As illustrated in FIGS. 8 to 10, when the YES button 72 is pressed via the operation unit 21, the server application 28a notifies the remote maintenance system 50 by the XMPP of the fact that the remote session is approved (Step S144).

Although the illustration is omitted, when the NO button 73 is pressed with respect to the remote session approval screen 70 displayed on the display 22 via the operation unit 21 at Step S143, the remote communication system 10 operates as follows. First, the server application 28a of the image forming apparatus 20 notifies the remote maintenance system 50 by the XMPP of the fact that the remote session has failed to be approved. Next, the session management unit 55c of the remote maintenance system 50 notifies the connection terminal 40 of the fact that the remote session has failed to be approved. Then, the remote session control unit 45d of the connection terminal 40 displays the fact that the remote session has failed to be approved on the display 42.

When receiving the notification of Step S144, the session management unit 55c of the remote maintenance system 50 requests connection information from the session relay system 60 by an Application Program Interface (API) (Step S145).

When receiving the request of Step S145, the Cloud Hub 61 of the session relay system 60 generates a session ID for the session relay system 60 to identify the communication made by this remote session (Step S146), and notifies the remote maintenance system 50 of the generated session ID as the connection information using the API (Step S147). As the session ID, random identification information is employed. The random identification information includes, for example, a random number sequence generated by a hash algorithm, such as a Hash-based Message Authentication Code (HMAC), which is BASE64 encoded so as to be handled on a Hypertext Transfer Protocol (HTTP).

When the session ID is notified at Step S147, the session management unit 55c of the remote maintenance system 50 generates a token for the remote maintenance system 50 to recognize a valid duration of the remote session (Step S148), and notifies the image forming apparatus 20 of the generated token and the session ID notified at Step S147 by the XMPP (Step S149).

Next, the session management unit 55c notifies the connection terminal 40 of the fact that the token and the session ID are obtained (Step S150).

When the token and the session ID are notified at Step S149, the server application 28a of the image forming apparatus 20 activates the Cloud Hub Agent 28b to which the token and the session ID notified at Step S149 are set (Step S171).

Next, the Cloud Hub Agent 28b notifies the session relay system 60 of the set token and session ID to request the session relay system 60 to establish the session (Step S172).

When receiving the request of Step S172, the Cloud Hub 61 associated with the session ID notified at Step S172 among the Cloud Hubs of the session relay system 60 requests the remote maintenance system 50 to execute an authentication by the token notified at Step S172, using the API (Step S173). Accordingly, the session management unit 55c of the remote maintenance system 50 executes the authentication requested at Step S173 (Step S174), and notifies the session relay system 60 of a result of the authentication using the API (Step S175).

When a successful authentication is notified at Step S175, the Cloud Hub 61 of the session relay system 60 stores a log indicating the start of the session with the image forming apparatus 20 in the session management database 64 (Step S176), and notifies the remote maintenance system 50 of the log stored at Step S176 together with the token, using the API (Step S177). Accordingly, the session management unit 55c of the remote maintenance system 50 manages the log notified at Step S177 as a log of the remote session identified by the token notified at Step S177 (Step S178), and replies the fact that this log is managed to the session relay system 60, using the API (Step S179).

When the successful authentication is notified at Step S175, the Cloud Hub 61 of the session relay system 60 notifies the image forming apparatus 20 of the fact that the session with the image forming apparatus 20 is established (Step S180). That is, an HTTP-based WebSocket connection is established between the image forming apparatus 20 and the session relay system 60.

After the process at Step S141, the remote session control unit 45d of the connection terminal 40 requests the connection information from the remote maintenance system 50 by polling until obtaining the connection information from the remote maintenance system 50 (Step S201).

When the token is already generated at Step S148 when the session management unit 55c of the remote maintenance system 50 receives the request of Step S201, the session management unit 55c of the remote maintenance system 50 notifies the connection terminal 40 of this token and the session ID notified from the session relay system 60 at Step S147 as the connection information (Step S202).

When the token and the session ID are notified at Step S202, the remote session control unit 45d of the connection terminal 40 activates the client 45c to which the token and the session ID notified at Step S202 are set (Step S203).

Next, the client 45c notifies the session relay system 60 of the set token and session ID to request the session relay system 60 to establish the session (Step S204).

When receiving the request of Step S204, the Web Agent 62 associated with the session ID notified at Step S204 among the Web Agents of the session relay system 60 notifies the Cloud Hub 61 of the token and the session ID notified at Step S204 to request the Cloud Hub 61 to establish the session (Step S205).

When receiving the request of Step S205, the Cloud Hub 61 of the session relay system 60 requests the remote maintenance system 50 to execute an authentication by the token notified at Step S205, using the API (Step S206). Accordingly, the session management unit 55c of the remote maintenance system 50 executes the authentication requested at Step S206 (Step S207), and notifies the session relay system 60 of a result of the authentication using the API (Step S208).

When a successful authentication is notified at Step S208, the Cloud Hub 61 of the session relay system 60 stores a log indicating the start of the session with the connection terminal 40 in the session management database 64 (Step S209), and notifies the remote maintenance system 50 of the log stored at Step S209 together with the token, using the API (Step S210). Accordingly, the session management unit 55c of the remote maintenance system 50 manages the log notified at Step S210 as a log of the remote session identified by the token notified at Step S210 (Step S211), and replies the fact that this log is managed to the session relay system 60, using the API (Step S212).

When the successful authentication is notified at Step S208, the Cloud Hub 61 of the session relay system 60 notifies the Web Agent 62 of the fact that the session with the connection terminal 40 is established (Step S213). Accordingly, the Web Agent 62 notifies the connection terminal 40 of the fact that the session with the connection terminal 40 is established (Step S214). That is, an HTTP-based WebSocket connection is established between the connection terminal 40 and the session relay system 60.

The session relay system 60 associates the WebSocket connection established with the image forming apparatus 20 by the operation illustrated in FIGS. 8 to 10 with the WebSocket connection established with the connection terminal 40 by the operation illustrated in FIGS. 8 to 10, using the session ID. Accordingly, the remote session is established by the operation illustrated in FIGS. 8 to 10.

The following describes an operation of the remote communication system 10 when the image forming apparatus 20 operates corresponding to the request from the connection terminal 40 via the remote session.

Figure 12:
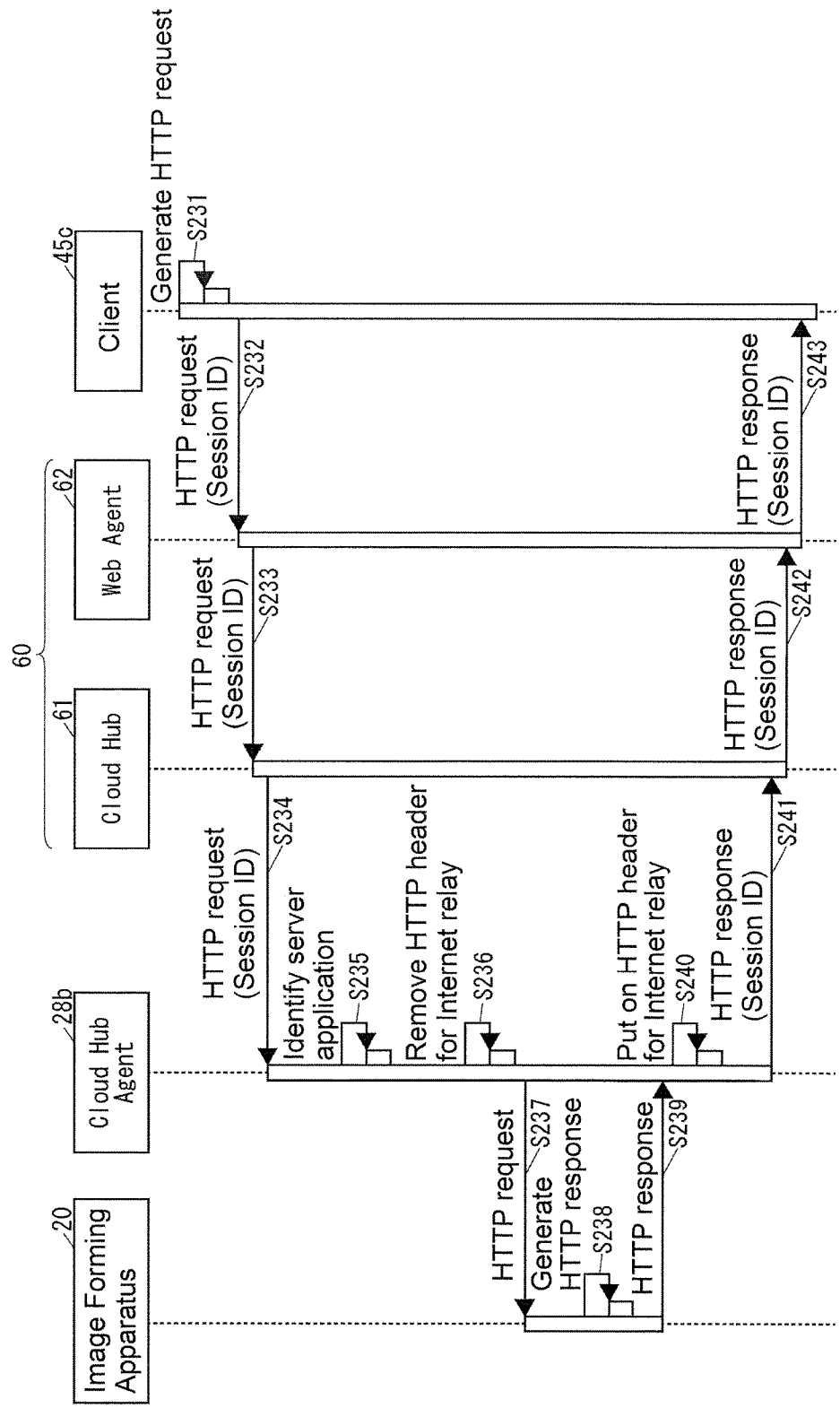
FIG. 12 illustrates an operation of the remote communication system according to the one embodiment when the image forming apparatus operates corresponding to a request from the connection terminal via the remote session.

FIG. 12 illustrates the operation of the remote communication system 10 when the image forming apparatus 20 operates corresponding to the request from the connection terminal 40 via the remote session.

When the remote session is established by the operation illustrated in FIGS. 8 to 10, the user of the connection terminal 40 can instruct a request toward the image forming apparatus 20 via the operation unit 41. When accepting the instruction to request toward the image forming apparatus 20, the client 45*c* of the connection terminal 40 generates an HTTP request for notifying the request instructed via the operation unit 41 as illustrated in FIG. 12 (Step S231).

Here, a structure of the HTTP request generated at Step S232 will be described.

Figure 13A:
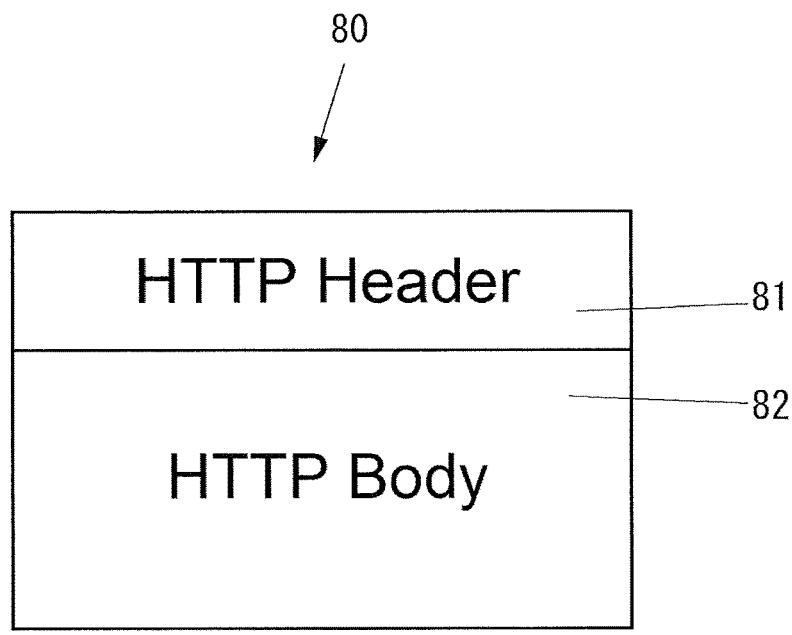
FIG. 13A illustrates HTTP data processed by a server application in the operation illustrated in FIG. 12.
Figure 13B:
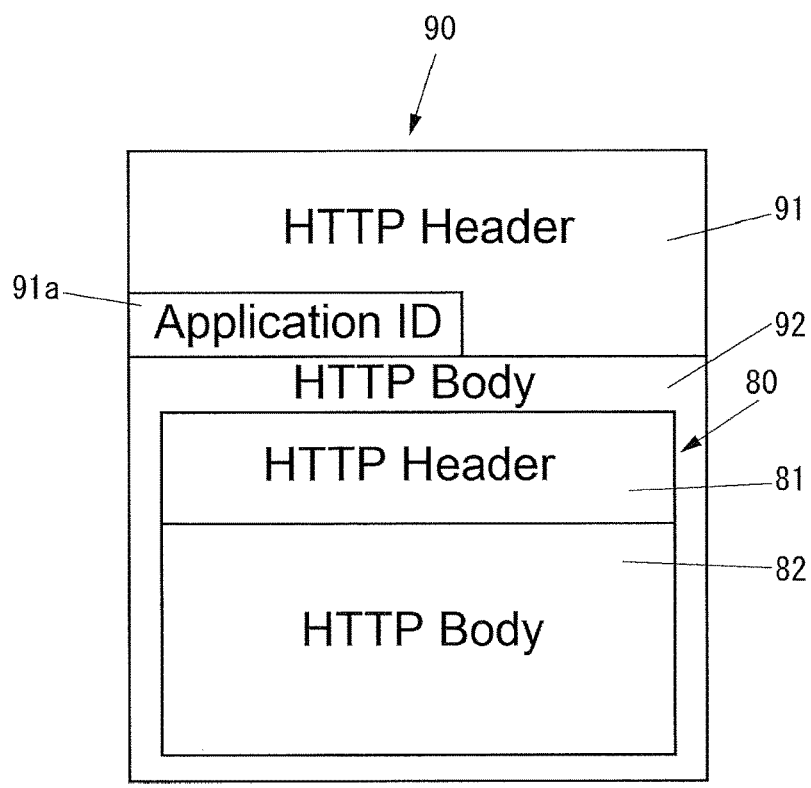
FIG. 13B illustrates HTTP data for relaying the HTTP data illustrated in FIG. 13A on Internet.

FIG. 13A illustrates HTTP data 80 processed by the server application 28*a*. FIG. 13B illustrates HTTP data 90 for relaying the HTTP data 80 illustrated in FIG. 13A on Internet.

As illustrated in FIGS. 13A and 13B, the HTTP data 80 includes an HTTP header 81 and an HTTP body 82. The HTTP data 90 includes an HTTP header 91 for relaying on Internet and the HTTP data 80 as an HTTP body 92. The HTTP header 91 includes an application ID 91*a* for identifying the server application 28*a*.

The client 45*c* generates HTTP data having a structure similar to that of the HTTP data 90 illustrated in FIG. 13B as the HTTP request for notifying the request instructed via the operation unit 41. Here, the session ID is stored in a position corresponding to the HTTP header 91.

As illustrated in FIG. 12, the client 45*c* of the connection terminal 40 transmits the HTTP request generated at Step S231 to the session relay system 60 by the WebSocket connection (Step S232).

When the HTTP request is transmitted at Step S232, the Web Agent 62 associated with the session ID included in the HTTP request transmitted at Step S232 among the Web Agents of the session relay system 60 passes this HTTP request to the Cloud Hub 61 (Step S233). Accordingly, the Cloud Hub 61 transmits this HTTP request to the image forming apparatus 20 by the WebSocket connection corresponding to the session ID included in this HTTP request (Step S234).

When the HTTP request is transmitted at Step S234, the Cloud Hub Agent 28*b* of the image forming apparatus 20 identifies the server application 28*a* corresponding to the application ID included in this HTTP request (Step S235).

Next, the Cloud Hub Agent 28*b* generates an HTTP request that is made by removing the HTTP header for relaying on Internet from the HTTP request transmitted at Step S234 (Step 8236). Here, the HTTP request generated at Step S236 is HTTP data having a structure similar to that of the HTTP data 80 illustrated in FIG. 13A.

Next, the Cloud Hub Agent 28*b* passes the HTTP request generated at Step S236 to the server application 28*a* identified at Step S235 (Step S237).

When the HTTP request is passed at Step S237, the server application 28*a* generates an HTTP response corresponding to this HTTP request (Step S238). Here, the HTTP response generated at Step S238 is HTTP data having a structure similar to that of the HTTP data 80 illustrated in FIG. 13A.

Next, the server application 28*a* passes the HTTP response generated at Step S238 to the Cloud Hub Agent 28*b* (Step S239).

When the HTTP response is passed at Step S239, the Cloud Hub Agent 28*b* generates an HTTP response that is made by putting on the HTTP header for relaying on Internet to the HTTP response passed at Step S239 (Step S240). Here, the HTTP response generated at Step S240 is HTTP data having a structure similar to that of the HTTP data 90 illustrated in FIG. 13B. The session ID is stored in a position corresponding to the HTTP header 91.

The Cloud Hub Agent 28*b* transmits the HTTP response generated at Step S240 to the session relay system 60 by the WebSocket connection (Step S241).

When the HTTP response is transmitted at Step S241, the Cloud Hub 61 associated with the session ID included in the HTTP response transmitted at Step S241 among the Cloud Hubs in the session relay system 60 passes this HTTP response to the Web Agent 62(Step S242). Accordingly, the Web Agent 62 transmits this HTTP response to the connection terminal 40 by the WebSocket connection corresponding to the session ID included in this HTTP response (Step S243).

Accordingly, the client 45*c* of the connection terminal 40 can receive the HTTP response transmitted at Step S243.

Next, an operation of the remote communication system 10 when the remote session is terminated will be described.

Figure 14:
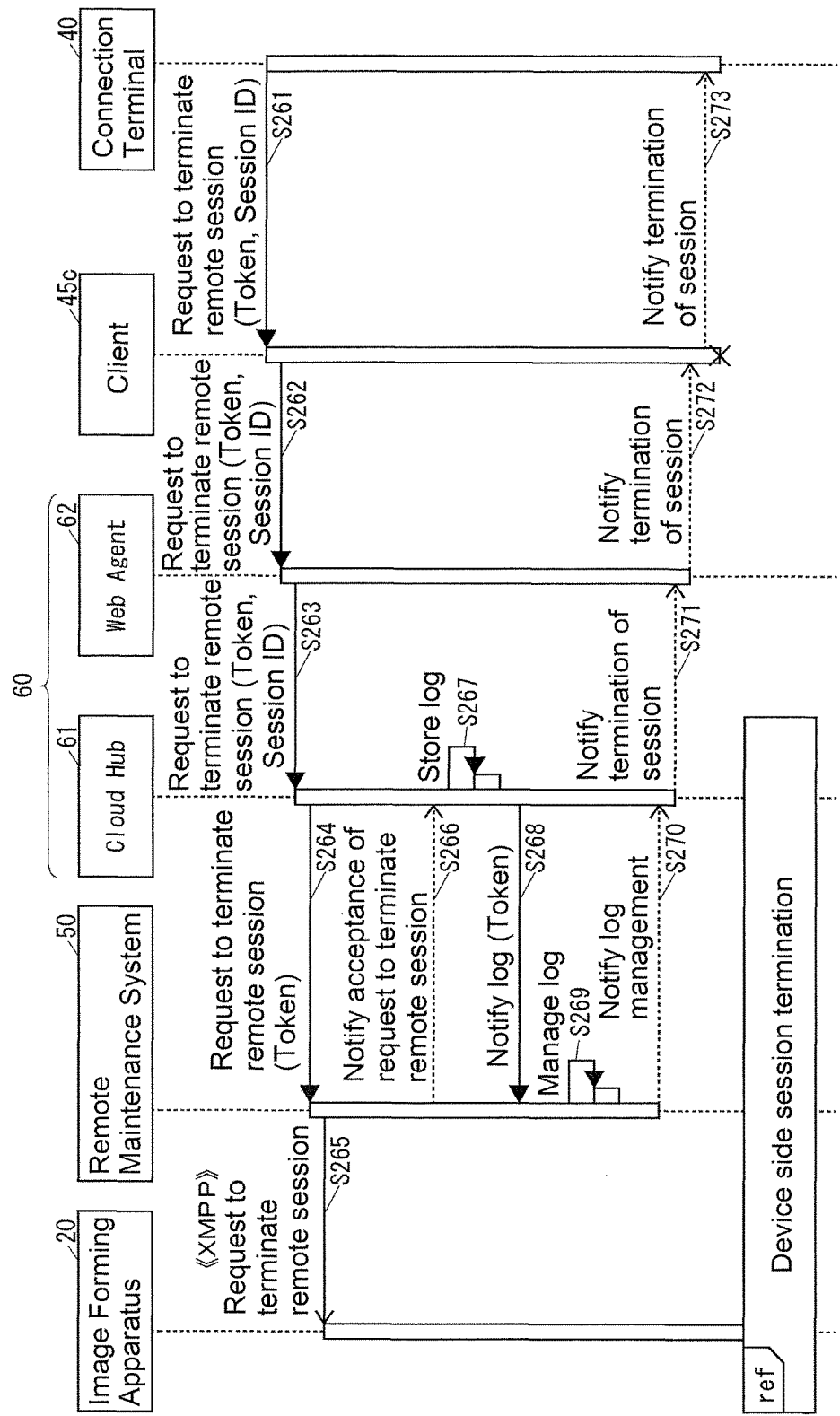
FIG. 14 illustrates an operation of the remote communication system according to the one embodiment when the remote session is terminated.
Figure 15:
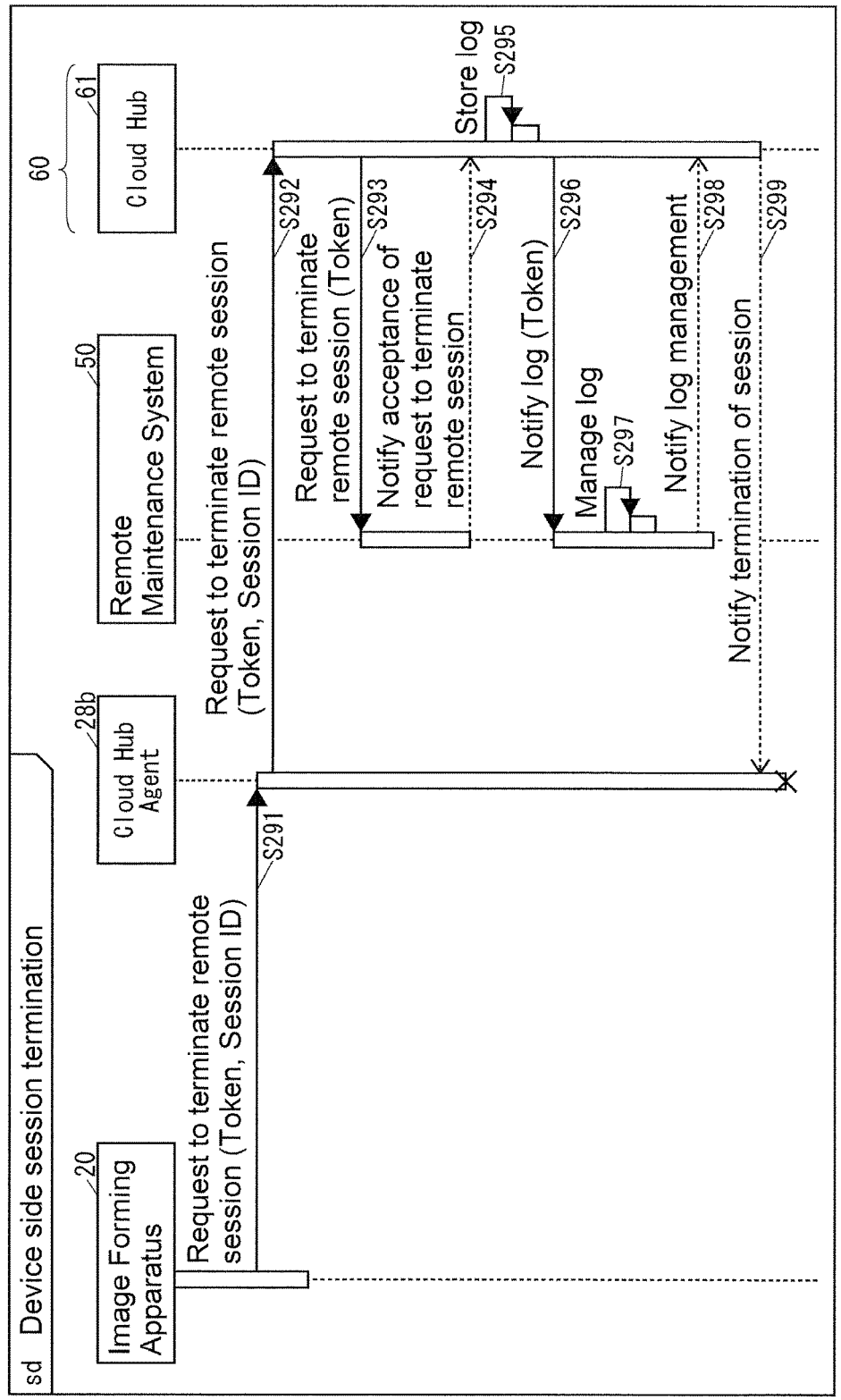
FIG. 15 illustrates a sequence diagram of a device side session termination illustrated in FIG. 14.

FIG. 14 illustrates the operation of the remote communication system 10 when the remote session is terminated. FIG. 15 illustrates a sequence diagram of a device side session termination illustrated in FIG. 14.

The user of the connection terminal 40 can instruct to terminate the remote session with a specific server application (hereinafter described as the server application 28*a* in the description of the operation illustrated in FIGS. 14 and 15) of a specific image forming apparatus (hereinafter described as the image forming apparatus 20 in the description of the operation illustrated in FIGS. 14 and 15) via the operation unit 41. When accepting the instruction to terminate the remote session, the remote session control unit 45*d* of the connection terminal 40 notifies the client 45*c* of the token and the session ID of the remote session instructed via the operation unit 41 as illustrated in FIGS. 14 and 15 to request the client 45*c* to terminate the remote session (Step S261). Accordingly, the client 45*c* requests the session relay system 60 to terminate the remote session requested at Step S261 by the WebSocket connection (Step S262).

When the termination of the remote session is requested at Step S262, the Web Agent 62 associated with a session ID included in the request at Step S262 among the Web Agents of the session relay system 60 passes this request to the Cloud Hub 61 (Step S263). Accordingly, the Cloud Hub 61 requests the remote maintenance system 50 to terminate the remote session identified by the token included in this request, using the API (Step S264).

When receiving the request of Step S264, the session management unit 55*c* of the remote maintenance system 50 requests the image forming apparatus 20 as a target of the remote session, which is a target of the request at Step S264, to terminate this remote session by the XMPP (Step S265).

Next, the session management unit 55c notifies the fact that the request to terminate the remote session is accepted to the session relay system 60, using the API (Step S266).

When the acceptance of the request to terminate the remote session is notified at Step S266, the Cloud Hub 61 of the session relay system 60 stores a log indicating the termination of the session with the connection terminal 40 in the session management database 64 (Step S267), and notifies the remote maintenance system 50 of the log stored at Step S267 together with the token, using the API (Step S268). Accordingly, the session management unit 55c of the remote maintenance system 50 manages the log notified at Step S268 as a log of the remote session identified by the token notified at Step S268 (Step S269), and replies the fact that this log is managed to the session relay system 60, using the API (Step S270).

When receiving the reply at Step S270, the Cloud Hub 61 of the session relay system 60 notifies the Web Agent 62 of the termination of the WebSocket connection between the connection terminal 40 and the session relay system 60 (Step S271). Accordingly, the Web Agent 62 notifies the connection terminal 40 of the termination of the WebSocket connection between the connection terminal 40 and the session relay system 60 (Step S272).

When receiving the notification at Step S272, the client 45c of the connection terminal 40 notifies the remote session control unit 45d of the termination of the WebSocket connection between the connection terminal 40 and the session relay system 60 (Step S273), and terminates its operation.

Accordingly, the remote session control unit 45d can, for example, display the fact that the WebSocket connection between the connection terminal 40 and the session relay system 60 is terminated on the display 42.

When receiving the request at Step S265, the server application 28a as the target of the remote session as the target of the request received at Step S265 among the server applications of the image forming apparatus 20 notifies the Cloud Hub Agent 28b of the token and the session ID of this remote session to request the Cloud Hub Agent 28b to terminate the remote session (Step S291). Accordingly, the Cloud Hub Agent 28b requests the session relay system 60 to terminate the remote session requested at Step S291 by the WebSocket connection (Step S292).

When receiving the request of Step S292, the Cloud Hub 61 of the session relay system 60 requests the remote maintenance system 50 to terminate the remote session identified by the token included in this request, using the API (Step S293).

When receiving the request of Step S293, the session management unit 55c of the remote maintenance system 50 notifies the session relay system 60 of the fact that the request to terminate the remote session is accepted, using the API (Step S294).

When the acceptance of the request to terminate the remote session is notified at Step S294, the Cloud Hub 61 of the session relay system 60 stores a log indicating the termination of the session with the image forming apparatus 20 in the session management database 64 (Step S295), and notifies the remote maintenance system 50 of the log stored at Step S295 together with the token, using the API (Step S296). Accordingly, the session management unit 55c of the remote maintenance system 50 manages the log notified at Step S296 as a log of the remote session identified by the token notified at Step S296 (Step S297), and replies the fact that this log is managed to the session relay system 60, using the API (Step S298).

When receiving the reply at Step S298, the Cloud Hub 61 of the session relay system 60 notifies the image forming apparatus 20 of the termination of the WebSocket connection between the image forming apparatus 20 and the session relay system 60 (Step S299).

When receiving the notification at Step S299, the Cloud Hub Agent 28b of the image forming apparatus 20 terminates its operation.

When the session management unit 55c of the remote maintenance system 50 confirms both that the log indicating the termination of the session between the image forming apparatus 20 and the session relay system 60 is notified from the session relay system 60 and that the log indicating the termination of the session between the connection terminal 40 and the session relay system 60 is notified from the session relay system 60, the session management unit 55c of the remote maintenance system 50 determines that the remote session between the image forming apparatus 20 and the connection terminal 40 via the session relay system 60 is terminated. When the session management unit 55c determines that the remote session between the image forming apparatus 20 and the connection terminal 40 via the session relay system 60 is not terminated, the session management unit 55c does not permit to establish a new remote session between the image forming apparatus 20 and the connection terminal 40 via the session relay system 60.

Next, a description will be given of an operation of the remote communication system 10 when deployment of the session relay system 60 is instructed.

Figure 16:
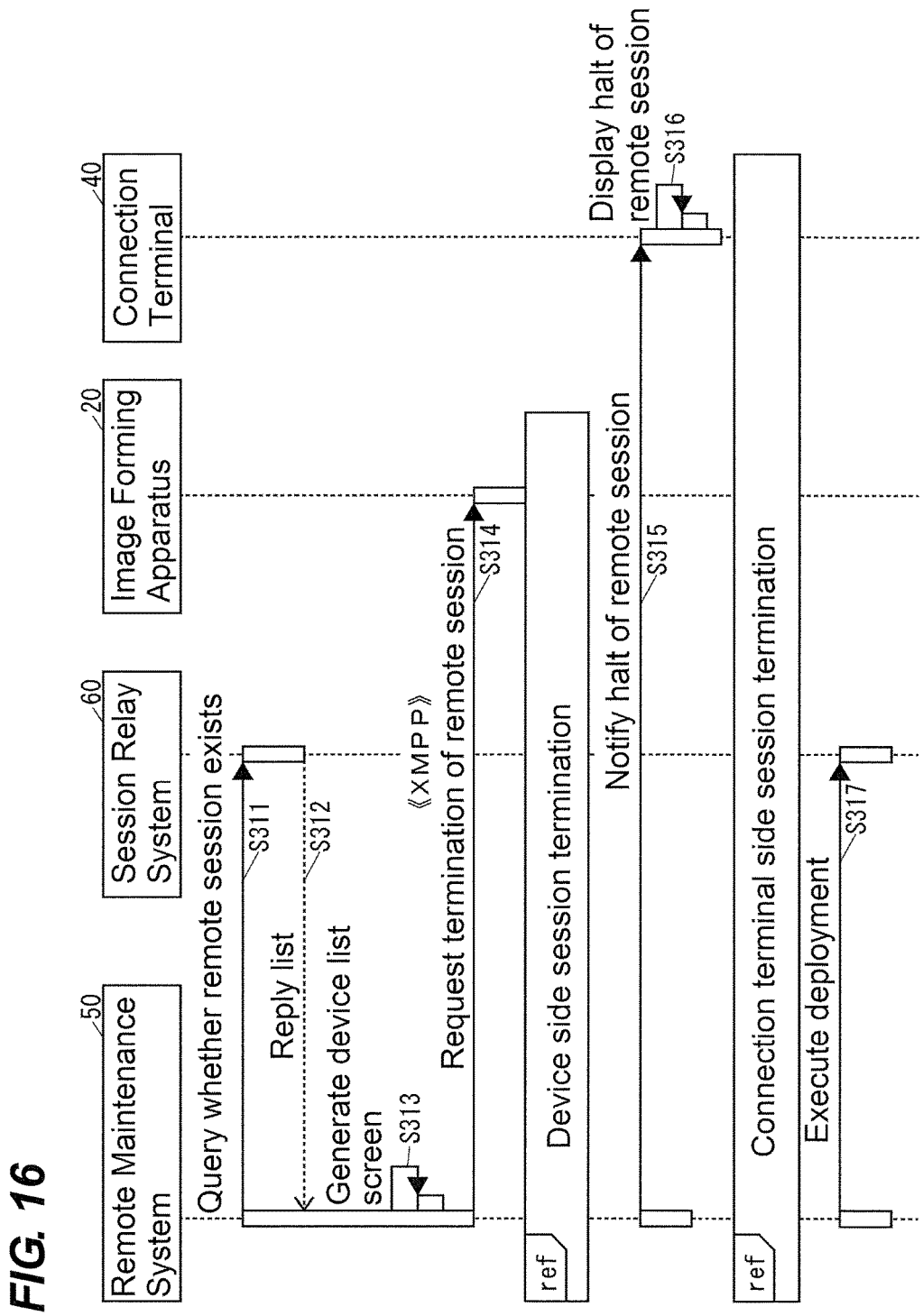
FIG. 16 illustrates an operation of the remote communication system according to the one embodiment when a deployment of the session relay system is instructed.
Figure 17:
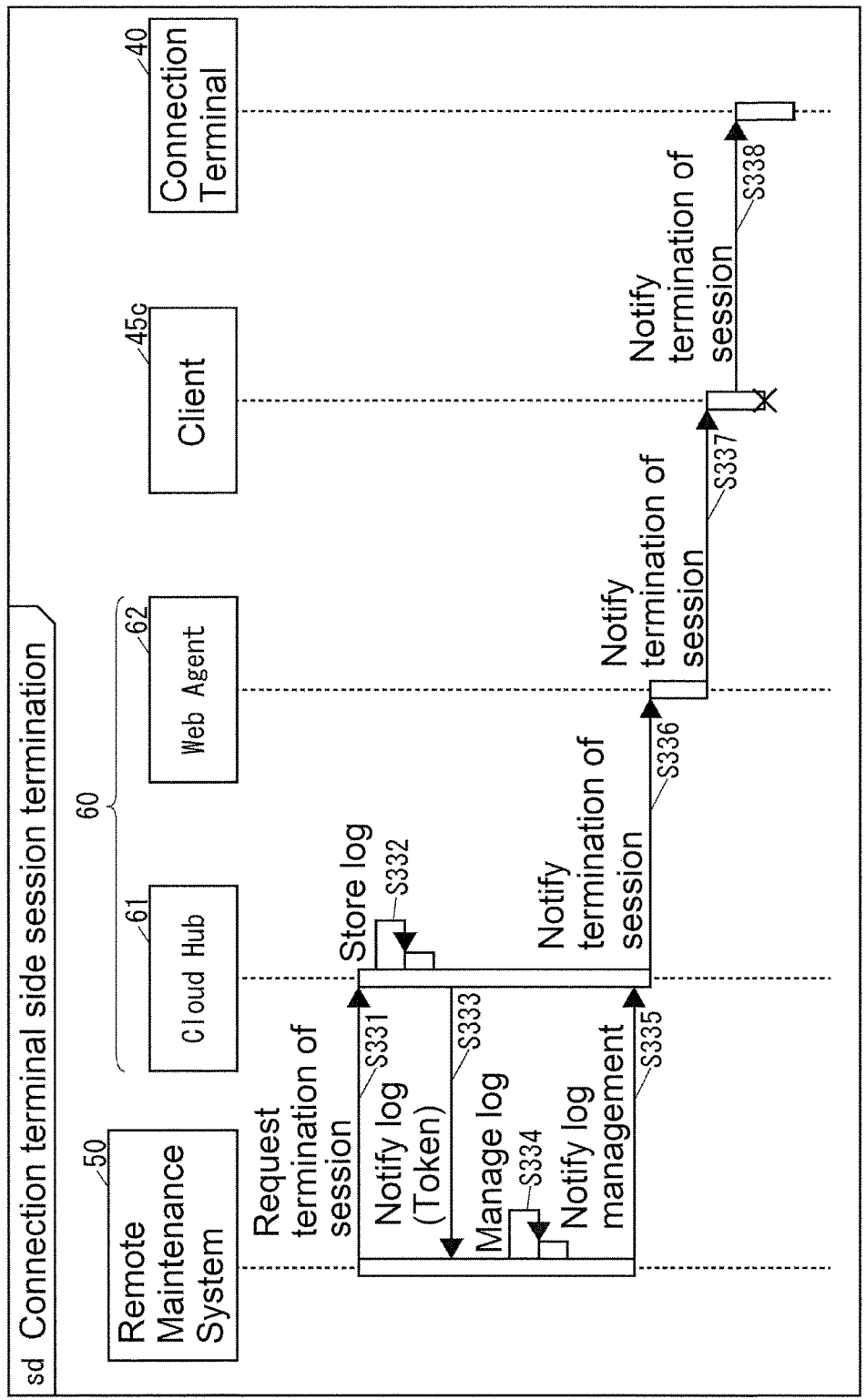
FIG. 17 illustrates a sequence diagram of a connection terminal side session termination illustrated in FIG. 16.

FIG. 16 illustrates an operation of the remote communication system 10 when the deployment of the session relay system 60 is instructed. FIG. 17 illustrates a sequence diagram of a connection terminal side session termination illustrated in FIG. 16.

When an administrator of the remote maintenance system 50 has logged in the remote maintenance system 50 from a computer (not illustrated), the administrator can instruct deployment of the session relay system 60 to the remote maintenance system 50 via an operation unit of the computer (not illustrated). As illustrated in FIGS. 16 and 17, when the deployment of the session relay system 60 is instructed, the session management unit 55c of the remote maintenance system 50 queries the session relay system 60 whether or not the remote session relayed by the session relay system 60 exists using the API (Step S311).

When the Master 63 of the session relay system 60 receives the query of Step S311, the Master 63 of the session relay system 60 replies a list of the image forming apparatuses as targets of the remote session relayed by the session relay system 60 to the remote maintenance system 50 using the API (Step S312).

When the session management unit 55c of the remote maintenance system 50 receives the reply of Step S312, the session management unit 55c of the remote maintenance system 50 generates a device list screen 75 (see FIG. 18) indicating the list replied at Step S312 (Step S313).

Figure 18:
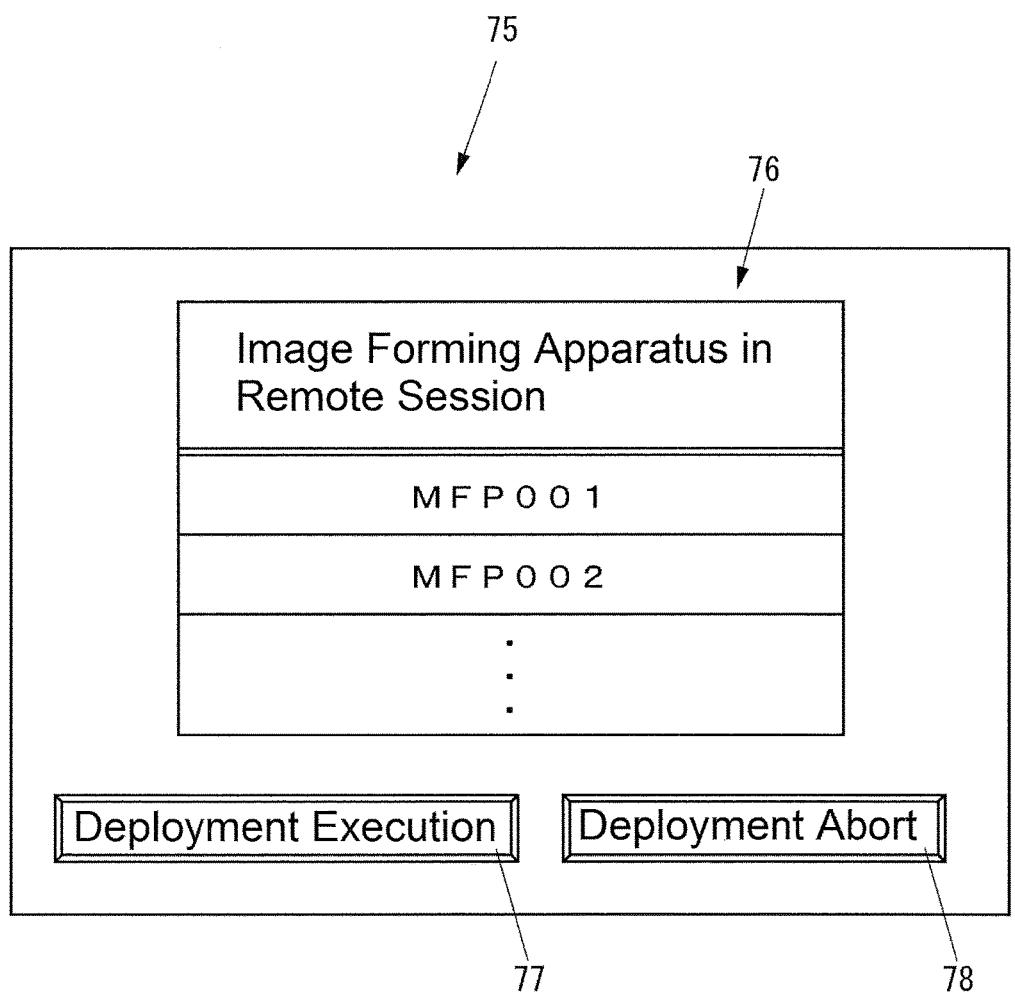
FIG. 18 illustrates an exemplary device list screen generated in the operation illustrated in FIG. 16.

FIG. 18 illustrates an exemplary device list screen 75 generated in the operation illustrated in FIG. 16.

The device list screen 75 illustrated in FIG. 18 includes a device list 76, a deployment execution button 77, and a deployment abort button 78. The device list 76 is a list of the image forming apparatuses as targets of the remote session relayed by the session relay system 60. The deployment execution button 77 instructs the execution of the deployment of the session relay system 60. The deployment abort button 78 instructs the abort of the deployment of the session relay system 60.

The administrator of the remote maintenance system 50 can confirm the device list screen 75 generated by the remote maintenance system 50 in Step S313 via a display of a computer (not illustrated). Then, the administrator of the remote maintenance system 50 can press any of the deployment execution button 77 and the deployment abort button 78 with an operation unit of the computer (not illustrated).

When the deployment abort button 78 is pressed, the session management unit 55c of the remote maintenance system 50 does not execute operations described below illustrated in FIGS. 16 and 17.

When the deployment execution button 77 is pressed, the session management unit 55c requests the image forming apparatus (hereinafter, described as the image forming apparatus 20 in the descriptions of the operations illustrated in FIGS. 16 and 17) included in the list replied at Step S312 to terminate the remote session by the XMPP (Step S314).

Accordingly, as illustrated in FIG. 15, the remote communication system 10 terminates the WebSocket connection established between the image forming apparatus 20 and the session relay system 60.

When a log that indicates the termination of the session between the image forming apparatus 20 and the session relay system 60 is notified from the session relay system 60, the session management unit 55c of the remote maintenance system 50 notifies a halt of the remote session to the connection terminal (hereinafter, described as the connection terminal 40 in the descriptions of the operations illustrated in FIGS. 16 and 17) as the target of the session associated with this session (Step S315).

When the remote session control unit 45d of the connection terminal 40 receives the notification of Step S315, the remote session control unit 45d of the connection terminal 40 displays the halt of the remote session on the display 42 (Step S316). Accordingly, the user of the connection terminal 40 can recognize the halt of the remote session.

In some cases, the user of the connection terminal 40 has logged out from the remote maintenance system 50 at a time point where the session management unit 55c of the remote maintenance system 50 receives the log indicating the termination of the session between the image forming apparatus 20 and the session relay system 60 from the session relay system 60. In this case, the operations in Steps S315 to S316 are executed after the user of the connection terminal 40 logs in the remote maintenance system 50 again.

When the user of the connection terminal 40 has logged out from the remote maintenance system 50 at the time point where the session management unit 55c of the remote maintenance system 50 receives the log indicating the termination of the session between the image forming apparatus 20 and the session relay system 60 from the session relay system 60, the session management unit 55c of the remote maintenance system 50 may notify the halt of the remote session to the administrator of the user of the connection terminal 40. At the time point where the session management unit 55c of the remote maintenance system 50 receives the log indicating the termination of the session between the image forming apparatus 20 and the session relay system 60 from the session relay system 60, the session management unit 55c of the remote maintenance system 50 may notify the halt of the remote session to the administrator of the user of the connection terminal 40 regardless whether or not the user of the connection terminal 40 has logged out from the remote maintenance system 50.

The notification of the halt of the remote session by the remote maintenance system 50 may be executed by various notification methods such as an e-mail.

When the log indicating the termination of the session between the image forming apparatus 20 and the session relay system 60 is notified from the session relay system 60, the session management unit 55c of the remote maintenance system 50 requests the session relay system 60 to terminate the session associated with this session, using the API (Step S331).

When the Cloud Hub 61 of the session relay system 60 receives the request in Step S331, the Cloud Hub 61 of the session relay system 60 stores a log that indicates the termination of the session whose termination has been requested at Step S331 in the session management database 64 (Step S332), and notifies the log stored at Step S332 to the remote maintenance system 50 with a token using the API (Step S333). Accordingly, the session management unit 55c of the remote maintenance system 50 manages the log notified at Step S333 as a log of the remote session identified with the token notified at Step S333 (Step S334), and replies a fact that this log is managed to the session relay system 60, using the API (Step S335).

When the Cloud Hub 61 of the session relay system 60 receives the reply of Step S335, the Cloud Hub 61 of the session relay system 60 notifies the termination of the WebSocket connection between the connection terminal (hereinafter, described as the connection terminal 40 in the descriptions of the operations illustrated in FIGS. 16 and 17) as the target of the session whose termination has been requested at Step S331 and the session relay system 60 to the Web Agent 62 (Step S336). Accordingly, the Web Agent 62 notifies the termination of the WebSocket connection between the connection terminal 40 and, the session relay system 60 to the connection terminal 40 (Step S337).

When the client 45c of the connection terminal 40 receives the notification of Step S337, the client 45c of the connection terminal 40 notifies the termination of the WebSocket connection between the connection terminal 40 and the session relay system 60 to the remote session control unit 45d (Step S338), and terminates the operation of the client 45c of the connection terminal 40 itself.

Accordingly, the remote session control unit 45d can display the fact of, for example, the termination of the WebSocket connection between the connection terminal 40 and the session relay system 60 on the display 42.

When the session management unit 55c of the remote maintenance system 50 confirms both that the log indicating the termination of the session between the image forming apparatus 20 and the session relay system 60 is notified from the session relay system 60 and that the log indicating the termination of the session between the connection terminal 40 and the session relay system 60 is notified from the session relay system 60, the session management unit 55c of the remote maintenance system 50 determines that the remote session between the image forming apparatus 20 and the connection terminal 40 via the session relay system 60 is terminated. When the session management unit 55c determines that the remote session between the image forming apparatus 20 and the connection terminal 40 via the session relay system 60 is not terminated, the session management unit 55c does not permit to establish a new remote session between the image forming apparatus 20 and the connection terminal 40 via the session relay system 60.

When the session management unit 55c determines that all the remote sessions between the image forming apparatus and the connection terminal via the session relay system 60 have terminated, the deployment execution unit 55d of the remote maintenance system 50 executes the deployment of the session relay system 60 (Step S317).

As described above, in the remote communication control system 15, the image forming apparatus 20 and the connection terminal 40 located outside the network to which the image forming apparatus 20 belongs are not directly connected but establish the remote session relayed by the session relay system 60. This improves the security when the image forming apparatus 20 is controlled from the connection terminal 40 located outside the network to which the image forming apparatus 20 belongs.

In the remote communication system 10, the image forming apparatus 20 establishes the WebSocket connection, which uses the session ID, with the session relay system 60 (Steps S171 to S180), the connection terminal 40 establishes the WebSocket connection, which uses the session ID, with the session relay system 60 (Steps S201 to S214), and the session relay system 60 relays the remote session by associating the connection established with the connection terminal 40 with the connection established with the image forming apparatus 20, using the session ID (Steps S231 to S243). With this configuration, in the remote communication system 10, only the connection terminal 40 notified of the session ID from the remote maintenance system 50 among the connection terminals located outside the network to which the image forming apparatus 20 belongs establishes the remote session with the image forming apparatus 20 relayed by the session relay system 60, thereby ensuring an improved security when the image forming apparatus 20 is controlled from the connection terminal 40 located outside the network to which the image forming apparatus 20 belongs.

In the remote communication system 10, the session ID used by the WebSocket connection established between the image forming apparatus 20 and the session relay system 60 and the session ID used by the WebSocket connection established between the connection terminal 40 and the session relay system 60 are identical session IDs. With this configuration, it is not necessary for the remote communication system 10 to associate two mutually different session IDs in the session relay system 60, thereby ensuring a simplified process of the, session ID in the session relay system 60. The session ID used by the WebSocket connection established between the image forming apparatus 20 and the session relay system 60 and the session ID used by the WebSocket connection established between the connection terminal 40 and the session relay system 60 may be mutually different as long as they are associated with one another in the session relay system 60.

In the remote communication system 10, at least one of the WebSocket connection established between the session relay system 60 and the connection terminal 40 and the WebSocket connection established between the session relay system 60 and the image forming apparatus 20 may be a connection with encrypted communication, such as a Secure Sockets Layer (SSL). With this configuration, the remote communication system 10 has at least a part of a path of the remote session between the connection terminal 40 and the image forming apparatus 20 relayed by the session relay system 60 encrypted, thereby reducing an occurrence of an invalid use, such as cracking, to the image forming apparatus 20.

In the remote communication system 10, the remote maintenance system 50 accepts the request (Step S141) to start the remote session from the connection terminal 40 when the user of the connection terminal 40 is logged in to the remote maintenance system 50. The remote maintenance system 50 does not execute the notification (Step S149) of the session ID to the image forming apparatus 20 and the notification (Step S202) of the session ID to the connection terminal 40 when the request to start the remote session is not accepted from the connection terminal 40. With this configuration, the remote communication system 10 has the remote session between the connection terminal 40 and the image forming apparatus 20 relayed by the session relay system 60 established only when the user of the connection terminal 40 can log in to the remote maintenance system 50, thereby ensuring the improved security of this remote session.

In the remote communication system 10, the remote maintenance system 50 does not execute the notification (Step S149) of the session ID to the image forming apparatus 20 and the notification (Step S202) of the session ID to the connection terminal 40 when the start of the remote session is not approved from the user of the image forming apparatus 20. With this configuration, the remote communication system 10 has the remote session between the connection terminal 40 and the image forming apparatus 20 relayed by the session relay system 60 established only when the start of the remote session is approved by the user of the image forming apparatus 20, thereby ensuring the improved security of this remote session. The remote maintenance system 50 may be configured not to execute any one of the notification of the session ID to the image forming apparatus 20 and the notification of the session ID to the connection terminal 40 when the start of the remote session is not approved by the user of the image forming apparatus 20.

In the remote communication system 10, the session relay system 60 changes the session ID (Step S146) every time the session ID is requested by the remote maintenance system 50 (Step S145). With this configuration, the remote communication system 10 has the session ID changed every time the remote session between the connection terminal 40 and the image forming apparatus 20 relayed by the session relay system 60 is established, thereby ensuring the improved security of this remote session.

The remote communication system 10 displays the screen identical to the screen displayed on the image forming apparatus 20 on the connection terminal 40 located in the outside of the network to which the image forming apparatus 20 belongs so as to operate the image forming apparatus 20 from this connection terminal 40, thereby ensuring an easy operation of the image forming apparatus 20 from the connection terminal 40 located in the outside of the network to which the image forming apparatus 20 belongs at a low cost. For example, the connection terminal 40 is configured to cause the user of the connection terminal 40 to execute various kinds of settings to the image forming apparatus 20, such as a setting of an address book of the image forming apparatus 20, by displaying a setting screen of the image forming apparatus 20 on the display 42. The connection terminal 40 is configured to cause the user of the connection terminal 40 to execute confirmations of various pieces of information of the image forming apparatus 20, such as a confirmation of errors occurred in the image forming apparatus 20, a confirmation of a printed count with the image forming apparatus 20, and a remaining amount of a toner in the image forming apparatus 20, by, for example, displaying a confirmation screen for the various pieces of information of the image forming apparatus 20 on the display 42. The connection terminal 40 is configured to cause the user of the connection terminal 40 to execute installing various kinds of software to the image forming apparatus 20, such as an installation of firmware to the image forming apparatus 20 and an installation of an application to the image forming apparatus 20, by, for example, displaying an installation screen of software to the image forming apparatus 20 on the display 42.

The connection terminal 40 can communicate with various kinds of applications in the image forming apparatus 20 by the remote session, thereby ensuring implementing various functions besides the maintenance to the image forming apparatus 20.

In this embodiment, the remote communication system 10 can execute the remote maintenance via the remote maintenance system 50 as the session management system as illustrated in FIG. 7. However, it is not necessary for the remote communication system 10 to be configured to execute the remote maintenance via the session management system.

When the deployment of the session relay system 60 is instructed, the remote communication control system 15 executes the deployment of the session relay system 60 (Step S317) after terminating the remote session by a valid process (Steps S314, S291 to S299, and S331 to S338) when the remote session relayed by the session relay system 60 exists. This reduces a possibility of an invalid disconnection of the remote session due to the deployment of the session relay system 60, thus ensuring the improvement of the quality of the remote session. The remote communication control system 15 can reduce a possibility of a sudden termination of the remote session. Then, for example, when the maintenance of the image forming apparatus is executed by the remote session, the quality and the stability of the maintenance of the image forming apparatus by the remote session can be improved. When the deployment of the session relay system 60 is instructed, the deployment execution unit 55*d* executes the deployment when the remote session relayed by the session relay system 60 does not exist.

The remote communication control system 15 terminates the remote session relayed by the session relay system 60 by a valid process before executing the deployment of the session relay system 60. This ensures the execution of reinforcement of resources such as the storage capacity and the function of the server for implementing the session relay system 60, and the execution of updating the system of the session relay system 60 executed for updating the software for implementing the session relay system 60, that is, the deployment of the session relay system 60, after the safety termination of the remote session.

When the deployment of the session relay system 60 is instructed, the remote communication control system 15 notifies the image forming apparatus as the target of the remote session by the device list screen 75 when the remote session relayed by the session relay system 60 exists, and then terminates this remote session when the remote communication control system 15 accepts a specific instruction, that is, an operation of the deployment execution button 77. This further improves the quality of the remote session.

In this embodiment, in the remote communication control system 15, the operation of the termination of the session between the connection terminal 40 and the session relay system 60 is executed when the log indicating the termination of the session between the image forming apparatus 20 and the session relay system 60 is notified from the session relay system 60 to the remote maintenance system 50, that is, when the remote maintenance system 50 detects the termination of the session between the image forming apparatus 20 and the session relay system 60. However, in the remote communication control system 15, the operation of the termination of the session between the connection terminal 40 and the session relay system 60 may be executed when the session relay system 60 detects the termination of the session between the image forming apparatus 20 and the session relay system 60.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A remote communication system comprising:
an image forming apparatus;
an electronic device located outside a network to which the image forming apparatus belongs;
a session relay system that relays a remote session which is a direct interconnection between the image forming apparatus and the electronic device; and
a session management system that manages the remote session,
wherein when an user of the electronic device is logged in to the session management system, the session management system accepts that the image forming apparatus designated as a target of the remote maintenance starts of the remote session from the electronic device to execute a start of the remote session instructed from the electronic device by an Extensible Messaging and Presence Protocol (XMPP),
wherein the session management system is notified an execution result of the remote session by the XMPP,
wherein the session management unit requests connection information from the session relay system by an Application Program Interface (API),
wherein the session relay system notifies a first session ID and a second session ID to the session management system, the first session ID and the second session ID being session IDs generated as the connection information to identify communication by the remote session in the session relay system when receiving the request of connection information,
the session management system executes a notification of the first session ID to the electronic device and a notification of the second session ID to the image forming apparatus,
the electronic device establishes an HTTP-based WebSocket connection with the session relay system, the connection using the first session ID,
the image forming apparatus establishes an HTTP-based WebSocket connection with the session relay system, the connection using the second session ID, and
the session relay system relays the remote session by associating the WebSocket connection established with the electronic device with the WebSocket connection established with the image forming apparatus using the first session ID and the second session ID.

2. The remote communication system according to claim 1,
wherein the first session ID and the second session ID are identical session IDs.

3. The remote communication system according to claim 1,
wherein at least one of the connection established between the session relay system and the electronic device using the first session ID and the connection established between the session relay system and the image forming apparatus using the second session ID is a connection with an encrypted communication.

4. The remote communication system according to claim 1,
wherein the session management system accepts a request of a start of the session from the electronic device when a user of the electronic device has logged in to the session management system, and
the session management system does not execute at least one of the notification of the first session ID to the electronic device and the notification of the second session ID to the image forming apparatus when the session management system has not accepted the request of the start of the remote session from the electronic device.

5. The remote communication system according to claim 1,
wherein the session management system does not execute at least one of the notification of the first session ID to the electronic device and the notification of the second session ID to the image forming apparatus when a user of the image forming apparatus has not approved the start of the remote session.

6. The remote communication system according to claim 1,
wherein the session relay system notifies the first session ID and the second session ID to the session management system caused by the requests of the first session ID and the second session ID by the session management system, and
the session relay system changes at least one of the first session ID and the second session ID every time when the session management system requests the first session ID and the second session ID.

7. The remote communication system according to claim 1,
wherein the electronic device receives data on a screen displayed by the image forming apparatus from the image forming apparatus via the remote session, displays a screen based on the data, and accepts an operation to the screen displayed based on the data to transmit the operation to the image forming apparatus via the remote session, and
the image forming apparatus operates corresponding to the operation received from the electronic device via the remote session.

8. The remote communication system according to claim 1,
wherein the session management system comprises:
a session relay system that relays the remote session between an image forming apparatus and an electronic device by associating a connection established with the image forming apparatus with a connection established with the electronic device, the electronic device being located outside a network to which the image forming apparatus belongs;
a session management unit that manages the remote session; and
a deployment execution unit that executes a deployment of the session relay system,
wherein when the deployment is instructed and when the remote session relayed by the session relay system exists, the session management unit terminates the existing remote session, and
when the deployment is instructed, the deployment execution unit executes the deployment when the remote session relayed by the session relay system does not exist.

9. The remote communication system according to claim 8,
wherein when the deployment is instructed and when the remote session relayed by the session relay system exists, the session management unit notifies the image forming apparatus as a target of the existing remote session, and subsequently terminates the existing remote session when the session management unit accepts a specific instruction.

* * * * *